United States Patent
Won

(10) Patent No.: US 12,302,447 B2
(45) Date of Patent: May 13, 2025

(54) APPARATUS, METHOD AND COMPUTER PROGRAM FOR EMERGENCY CALL

(71) Applicant: NOKIA TECHNOLOGIES OY, Espoo (FI)

(72) Inventor: Sung Hwan Won, Seoul (KR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/253,012

(22) PCT Filed: Jun. 25, 2018

(86) PCT No.: PCT/EP2018/066999
§ 371 (c)(1),
(2) Date: Dec. 16, 2020

(87) PCT Pub. No.: WO2020/001739
PCT Pub. Date: Jan. 2, 2020

(65) Prior Publication Data
US 2021/0120628 A1    Apr. 22, 2021

(51) Int. Cl.
*H04W 76/50* (2018.01)
*H04W 4/90* (2018.01)
(Continued)

(52) U.S. Cl.
CPC ............. *H04W 76/50* (2018.02); *H04W 4/90* (2018.02); *H04W 8/24* (2013.01); *H04W 36/0022* (2013.01); *H04W 48/20* (2013.01)

(58) Field of Classification Search
CPC ......... H04W 76/50; H04W 4/90; H04W 8/24; H04W 36/0022; H04W 48/20; H04W 88/06; H04W 48/18
(Continued)

(56) References Cited

U.S. PATENT DOCUMENTS

2010/0124897 A1 * 5/2010 Edge .................. H04W 76/50
455/404.1
2014/0045448 A1 * 2/2014 Mallick ................ H04W 76/50
455/404.1
(Continued)

FOREIGN PATENT DOCUMENTS

CN    103081532 A    5/2013
EP    2 667 659 A2    11/2013
(Continued)

OTHER PUBLICATIONS

International Search Report & Written Opinion dated Oct. 2, 2018 corresponding to International Patent Application No. PCT/EP2018/066999.
(Continued)

*Primary Examiner* — Michael Y Mapa
(74) *Attorney, Agent, or Firm* — SQUIRE PATTON BOGGS (US) LLP

(57) ABSTRACT

An apparatus comprising: at least one processor; and at least one memory including computer program code; the at least one memory and the computer program code configured to, with the at least one processor, cause the apparatus at least to: determine that a user equipment is to switch from using a first radio access technology to using a second radio access technology to perform an emergency call; determine that the user equipment supports access to a core network via a cell of the second radio access technology; and cause the user equipment to switch from using the first radio access technology to the second radio access technology.

7 Claims, 17 Drawing Sheets

(51) Int. Cl.
*H04W 8/24* (2009.01)
*H04W 36/00* (2009.01)
*H04W 48/20* (2009.01)

(58) Field of Classification Search
USPC .......................... 455/404.1, 432.1–444, 521
See application file for complete search history.

(56) References Cited

U.S. PATENT DOCUMENTS

| | | | |
|---|---|---|---|
| 2015/0281929 A1* | 10/2015 | Shih ...................... | H04W 76/50 |
| | | | 455/552.1 |
| 2016/0366574 A1 | 12/2016 | Dahan et al. | |
| 2020/0015128 A1* | 1/2020 | Stojanovski ...... | H04W 36/0022 |
| 2020/0280836 A1* | 9/2020 | Velev .................... | H04W 76/16 |
| 2020/0336885 A1* | 10/2020 | Schliwa-Bertling .... | H04W 4/12 |

FOREIGN PATENT DOCUMENTS

| | | |
|---|---|---|
| WO | 2010/141882 A2 | 12/2010 |
| WO | WO 2014/182106 A1 | 11/2014 |
| WO | 2015/020585 A1 | 2/2015 |

OTHER PUBLICATIONS

3GPP TS 24.229 V15.3.0 (Jun. 2018), Technical Specification, 3rd Generation Partnership Project; Technical Specification Group Core Network and Terminals; IP multimedia call control protocol based on Session Initiation Protocol (SIP) and Session Description Protocol (SDP); Stage 3 (Release 15), Jun. 22, 2018, XP051453246.
ZTE Corporation, "Consideration on Emergency/Voice fallback from NR to LTE," 3GPP Draft; R2-1807312, 3GPP TSG-RAN WG2 Meeting #102, Busan, Korea, May 20, 2018, XP051443717.
Nokia et al.: "EMF per RAT," 3GPP Draft; C1-183750, 3GPP TSG-CT WG1 Meeting #111, Osaka, Japan, May 28, 2018, XP051459814.
First Examination Report dated Jan. 5, 2022 corresponding to Indian Patent Application No. 202147001446.
Notification of Reasons for Rejection (non-final) dated Feb. 14, 2022 corresponding to Japanese Patent Application No. 2020-572888 with English summary thereof.
Samsung et al., "Change "N1 mode radio capability" to "N1 mode capability for 3GPP access"," 3GPP Draft; C1-183524, 3GPP TSG-CT WG1 Meeting #111, Osaka, Japan, May 28, 2018.
Sharp et al., "Emergency call in single registration mode," 3GPP Draft; C1-183840, 3GPP TSG-CT WG1 Meeting #111, Osaka, Japan, May 28, 2018.
Indonesian Office Action corresponding to ID Appln. No. P00202010606, dated Dec. 29, 2022.
Official Action issued in corresponding Vietnamese Patent Application No. 1-2020-07525 dated Jan. 18, 2024, with English language translation thereof.
First Office Action issued in corresponding Chinese Patent Application No. 201880096147.1 dated Dec. 26, 2023, with concise English language summary thereof.
Office Action dated Aug. 15, 2024 issued in corresponding Thailand patent application No. 2001007463, with English language translation thereof.
Office Action issued in corresponding Mexican Patent Application No. MX/a/2020/014049 dated May 14, 2024, with English language summary thereof.
Substantive Examination Adverse Report (Section 30(1)) issued in corresponding Malaysian Patent Application No. PI 2020006914 dated Oct. 21, 2024.
European Office Action issued in corresponding European Patent Application No. 24219814.1-1215 on Mar. 28, 2025.

* cited by examiner

APPARATUS, METHOD AND COMPUTER PROGRAM FOR EMERGENCY CALL

FIELD OF THE DISCLOSURE

The present disclosure relates to an apparatus, a method and a computer program to manage communication in a communication system.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known as the long-term evolution (LTE) of the Universal Mobile Telecommunications System (UMTS) radio-access technology. Another example communication system is so called 5G radio or NR (new radio) access technology.

SUMMARY

According to an aspect there is provided an apparatus comprising at least one processor and at least one memory including computer code for one or more programs, the at least one memory and the computer code configured, with the at least one processor, to cause the apparatus at least to: determine that a user equipment is to switch from using a first radio access technology to using a second radio access technology to perform an emergency call; determine that the user equipment supports access to a core network via a cell of the second radio access technology; and cause the user equipment to switch from using the first radio access technology to the second radio access technology.

The at least one memory and the computer program code configured to, with the at least one processor, may cause the apparatus at least to: determine that there is a suitable cell of the second radio access technology accessible by the user equipment and connected to the core network.

The core network may be a first radio access technology core network.

The core network may be a second radio access technology core network.

The user equipment may be camping on a cell of the first radio access technology.

Switching from using a first radio access technology to using a second radio access technology may comprise selecting a cell of the second radio access technology.

The at least one memory and the computer program code configured to, with the at least one processor, may cause the apparatus at least to: determine the first radio access technology; and determine at least one condition to switch from using the first radio access technology to a second radio access technology based thereon.

The at least one memory and the computer program code configured to, with the at least one processor, may cause the apparatus at least to: determine whether the user equipment operates in a single registration mode or a dual registration mode; and determine at least one condition to switch from using a first radio access technology to using a second radio access technology based thereon.

The at least one memory and the computer program code configured to, with the at least one processor, may cause the apparatus at least to: determine whether (i) both the first radio access technology and the second radio access technology support an emergency service or only the first radio access technology supports the emergency service, (ii) only the second radio access technology supports the emergency service or (iii) none of the first radio access technology and the second radio access technology supports the emergency service; and determine at least one condition to switch the user equipment from using a first cell of a first radio access technology to using a second cell of a second radio access technology based thereon.

The at least one memory and the computer program code configured to, with the at least one processor, may cause the apparatus at least to: determine that there is no suitable cell of the second radio access technology accessible by the user equipment and connected to a first radio access network core network.

The at least one memory and the computer program code configured to, with the at least one processor, may cause the apparatus at least to: disable first radio access technology capability of the user equipment.

The at least one memory and the computer program code configured to, with the at least one processor, may cause the apparatus at least to: determine that the user equipment is not attached for second radio access technology services.

The at least one memory and the computer program code configured to, with the at least one processor, may cause the apparatus at least to: determine whether there is a suitable cell of the second radio access technology accessible by the user equipment and connected to a second radio access network core network.

The at least one memory and the computer program code configured to, with the at least one processor, may cause the apparatus at least to: determine that the user equipment is attached for second radio access technology services.

The at least one memory and the computer program code configured to, with the at least one processor, may cause the apparatus at least to: determine that emergency bearer services are supported.

The at least one memory and the computer program code configured to, with the at least one processor, may cause the apparatus at least to: cause the user equipment to perform the emergency call by triggering an internet protocol connectivity access procedure.

The at least one memory and the computer program code configured to, with the at least one processor, may cause the apparatus at least to: cause the user equipment to perform the emergency call by triggering an emergency service fallback procedure.

The at least one memory and the computer program code configured to, with the at least one processor, may cause the apparatus at least to: cause the user equipment to perform the emergency call by triggering a packet data unit session establishment procedure.

The first radio access technology may be 5G and the second radio access technology may be E-UTRA or vice versa.

According to an aspect there is provided an apparatus comprising means for: determining that a user equipment is to switch from using a first radio access technology to using a second radio access technology to perform an emergency call; determining that the user equipment supports access to a core network via a cell of the second radio access technology; and causing the user equipment to switch from using the first radio access technology to the second radio access technology.

The apparatus may comprise means for: determining that there is a suitable cell of the second radio access technology accessible by the user equipment and connected to the core network.

The core network may be a first radio access technology core network.

The core network may be a second radio access technology core network.

The user equipment may be camping on a cell of the first radio access technology.

Switching from using a first radio access technology to using a second radio access technology may comprise selecting a cell of the second radio access technology.

The apparatus may comprise means for: determining the first radio access technology; and determining at least one condition to switch from using the first radio access technology to a second radio access technology based thereon.

The apparatus may comprise means for: determining whether the user equipment operates in a single registration mode or a dual registration mode; and determining at least one condition to switch from using a first radio access technology to using a second radio access technology based thereon.

The apparatus may comprise means for: determining whether (i) both the first radio access technology and the second radio access technology support an emergency service or only the first radio access technology supports the emergency service, (ii) only the second radio access technology supports the emergency service or (iii) none of the first radio access technology and the second radio access technology supports the emergency service; and determining at least one condition to switch the user equipment from using a first cell of a first radio access technology to using a second cell of a second radio access technology based thereon.

The apparatus may comprise means for: determining that there is no suitable cell of the second radio access technology accessible by the user equipment and connected to a first radio access network core network.

The apparatus may comprise means for: disabling first radio access technology capability of the user equipment.

The apparatus may comprise means for: determining that the user equipment is not attached for second radio access technology services.

The apparatus may comprise means for: determining whether there is a suitable cell of the second radio access technology accessible by the user equipment and connected to a second radio access network core network.

The apparatus may comprise means for: determining that the user equipment is attached for second radio access technology services.

The apparatus may comprise means for: determining that emergency bearer services are supported.

The apparatus may comprise means for: causing the user equipment to perform the emergency call by triggering an internet protocol connectivity access procedure.

The apparatus may comprise means for: causing the user equipment to perform the emergency call by triggering an emergency service fallback procedure.

The apparatus may comprise means for: causing the user equipment to perform the emergency call by triggering a packet data unit session establishment procedure.

The first radio access technology may be 5G and the second radio access technology may be E-UTRA or vice versa.

According to an aspect there is provided a method comprising: determining that a user equipment is to switch from using a first radio access technology to using a second radio access technology to perform an emergency call; determining that the user equipment supports access to a core network via a cell of the second radio access technology; and causing the user equipment to switch from using the first radio access technology to the second radio access technology.

The method may comprise: determining that there is a suitable cell of the second radio access technology accessible by the user equipment and connected to the core network.

The core network may be a first radio access technology core network.

The core network may be a second radio access technology core network.

The user equipment may be camping on a cell of the first radio access technology.

Switching from using a first radio access technology to using a second radio access technology may comprise selecting a cell of the second radio access technology.

The method may comprise: determining the first radio access technology; and determining at least one condition to switch from using the first radio access technology to a second radio access technology based thereon.

The method may comprise: determining whether the user equipment operates in a single registration mode or a dual registration mode; and determining at least one condition to switch from using a first radio access technology to using a second radio access technology based thereon.

The method may comprise: determining whether (i) both the first radio access technology and the second radio access technology support an emergency service or only the first radio access technology supports the emergency service, (ii) only the second radio access technology supports the emergency service or (iii) none of the first radio access technology and the second radio access technology supports the emergency service; and determining at least one condition to switch the user equipment from using a first cell of a first radio access technology to using a second cell of a second radio access technology based thereon.

The method may comprise: determining that there is no suitable cell of the second radio access technology accessible by the user equipment and connected to a first radio access network core network.

The method may comprise: disabling first radio access technology capability of the user equipment.

The method may comprise: determining that the user equipment is not attached for second radio access technology services.

The method may comprise: determining whether there is a suitable cell of the second radio access technology accessible by the user equipment and connected to a second radio access network core network.

The method may comprise: determining that the user equipment is attached for second radio access technology services.

The method may comprise: determining that emergency bearer services are supported.

The method may comprise: causing the user equipment to perform the emergency call by triggering an internet protocol connectivity access procedure.

The method may comprise: causing the user equipment to perform the emergency call by triggering an emergency service fallback procedure.

The method may comprise: causing the user equipment to perform the emergency call by triggering a packet data unit session establishment procedure.

The first radio access technology may be 5G and the second radio access technology may be E-UTRA or vice versa.

According to an aspect there is provided a computer program comprising computer executable code which when run on at least one process is configured to: determine that a user equipment is to switch from using a first radio access technology to using a second radio access technology to perform an emergency call; determine that the user equipment supports access to a core network via a cell of the second radio access technology; and cause the user equipment to switch from using the first radio access technology to the second radio access technology.

The at least one process may be configured to: determine that there is a suitable cell of the second radio access technology accessible by the user equipment and connected to the core network.

The core network may be a first radio access technology core network.

The core network may be a second radio access technology core network.

The user equipment may be camping on a cell of the first radio access technology.

Switching from using a first radio access technology to using a second radio access technology may comprise selecting a cell of the second radio access technology.

The at least one process may be configured to: determine the first radio access technology; and determining at least one condition to switch from using the first radio access technology to a second radio access technology based thereon.

The at least one process may be configured to: determine whether the user equipment operates in a single registration mode or a dual registration mode; and determine at least one condition to switch from using a first radio access technology to using a second radio access technology based thereon.

The at least one process may be configured to: determine whether (i) both the first radio access technology and the second radio access technology support an emergency service or only the first radio access technology supports the emergency service, (ii) only the second radio access technology supports the emergency service or (iii) none of the first radio access technology and the second radio access technology supports the emergency service; and determine at least one condition to switch the user equipment from using a first cell of a first radio access technology to using a second cell of a second radio access technology based thereon.

The at least one process may be configured to: determine that there is no suitable cell of the second radio access technology accessible by the user equipment and connected to a first radio access network core network.

The at least one process may be configured to: disable first radio access technology capability of the user equipment.

The at least one process may be configured to: determine that the user equipment is not attached for second radio access technology services.

The at least one process may be configured to: determine whether there is a suitable cell of the second radio access technology accessible by the user equipment and connected to a second radio access network core network.

The at least one process may be configured to: determine that the user equipment is attached for second radio access technology services.

The at least one process may be configured to: determine that emergency bearer services are supported.

The at least one process may be configured to: cause the user equipment to perform the emergency call by triggering an internet protocol connectivity access procedure.

The at least one process may be configured to: cause the user equipment to perform the emergency call by triggering an emergency service fallback procedure.

The at least one process may be configured to: cause the user equipment to perform the emergency call by triggering a packet data unit session establishment procedure.

The first radio access technology may be 5G and the second radio access technology may be E-UTRA or vice versa.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

5GCN: 5G core network
CAN: Connectivity access network
CS: Circuit Switched
DR: Dual registration
EMC: Emergency service support indicator
EMC BS: Emergency bearer services indicator
EMF: Emergency service fallback indicator
EPC: Evolved packet core network
EPS: Evolved packet system ESFB: Emergency services fallback
E-UTRA: Evolved UMTS Terrestrial radio access
IP: Internet protocol
IMCN: Internet Multimedia core network
NR: 5G new radio
PDU: Packet data unit
RAT: Radio access technology
SR: Single registration

BRIEF DESCRIPTION OF THE FIGURES

Embodiments will now be described, by way of example only, with reference to the accompanying Figures in which.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1 and 2 to assist in understanding the technology underlying the described examples.

Figure 1:
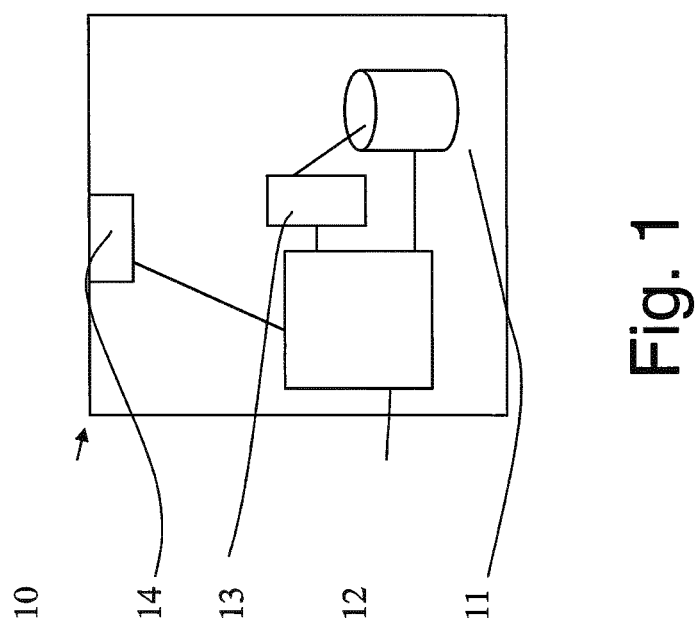
FIG. 1 shows a schematic representation of a control apparatus.
Figure 2:
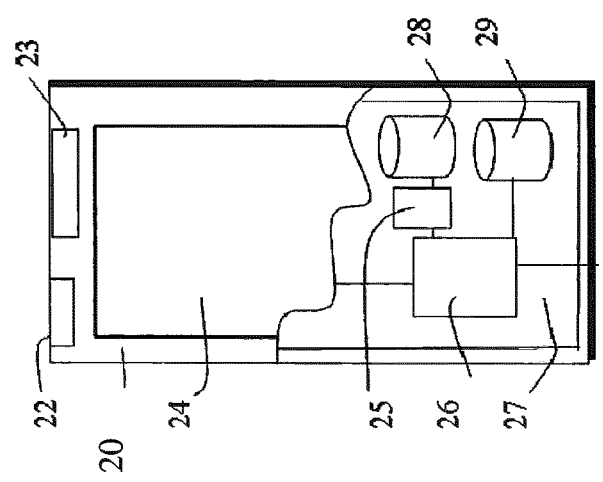
FIG. 2 shows a schematic representation of a communication device.

A communication device 20 or terminal such as shown in FIG. 2 can be provided wireless access via cells, base stations or similar wireless transmitter and/or receiver nodes providing access points of a radio access system. Access points and hence communications there through are typically controlled by at least one appropriate controller apparatus so as to enable operation thereof and management of mobile communication devices in communication therewith. FIG. 1 shows an example of a control apparatus for a node, for example to be integrated with, coupled to and/or otherwise for controlling the access points. The control apparatus 10 can be arranged to allow communications between a user equipment and a core network. For this purpose the control apparatus comprises at least one memory 11, at least one data processing unit 12, 13 and an input/output interface 14. Via the interface the control apparatus can be coupled to relevant other components of the access point. The control apparatus can be configured to execute an appropriate software code to provide the control functions. It shall be appreciated that similar components can be provided in a control apparatus provided elsewhere in the network system, for example in a core network entity. The control apparatus can be interconnected with other control entities. The control apparatus and functions may be distributed between several control units. In some embodiments, each base station can comprise a control apparatus. In alternative embodiments, two or more base stations may share a control apparatus.

Access points and associated controllers may communicate with each other via a fixed line connection and/or via a radio interface. The logical connection between the base station nodes can be provided for example by an X2 or the like interface. This interface can be used for example for coordination of operation of the stations and performing reselection or handover operations.

The communication device or user equipment (UE) 20 may comprise any suitable device capable of at least receiving wireless communication of data. For example, the device can be handheld data processing device equipped with radio receiver, data processing and user interface apparatus. Non-limiting examples include a mobile station (MS) such as a mobile phone or what is known as a 'smart phone', a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, ear pieces with wireless connectivity, jewellery and so on, universal serial bus (USB) sticks with wireless capabilities, modem data cards, machine type devices or any combinations of these or the like.

FIG. 2 shows a schematic, partially sectioned view of a possible communication device. More particularly, a handheld or otherwise mobile communication device (or user equipment UE) 20 is shown. A mobile communication device is provided with wireless communication capabilities and appropriate electronic control apparatus for enabling operation thereof. Thus, the communication device 20 is shown being provided with at least one data processing entity 26, for example a central processing unit and/or a core processor, at least one memory 28 and other possible components such as additional processors 25 and memories 29 for use in software and hardware aided execution of tasks it is designed to perform. The data processing, storage and other relevant control apparatus can be provided on an appropriate circuit board 27 and/or in chipsets. Data processing and memory functions provided by the control apparatus of the communication device are configured to cause control and signalling operations in accordance with certain embodiments as described later in this description. A user may control the operation of the communication device by means of a suitable user interface such as touch sensitive display screen or pad 24 and/or a key pad, one of more actuator buttons 22, voice commands, combinations of these or the like. A speaker and a microphone are also typically provided. Furthermore, a mobile communication device may comprise appropriate connectors (either wired or wireless) to other devices and/or for connecting external accessories, for example hands-free equipment, thereto.

The communication device may communicate wirelessly via appropriate apparatus for receiving and transmitting signals. FIG. 2 shows schematically a radio block 23 connected to the control apparatus of the device. The radio block can comprise a radio part and associated antenna arrangement. The antenna arrangement may be arranged internally or externally to the communication device.

The communication device may operate in an SR mode wherein the communication device is registered to a single radio access technology core network (e.g. EPC or 5GCN) or in a DR mode wherein the communication device is registered to two radio access technology core networks (e.g. EPC and 5GCN).

Subclause U.2.2.6.4 of 3GPP TS 24.229 describes how the UE in SR mode operates according to the EMC and EMF indicators and UE's support of ESFB when a UE is in a cell of a specific access technology. However, there are several incomplete or inaccurate descriptions in the subclause. One or more of the following embodiments address these issues.

In summary, if the EMC indicates "Emergency services not supported", the UE supports ESFB, and the ESFB is N, it may be desirable that:

the UE attempts to select a RAT cell if the EMF indicates that ESFB is supported in RAT; and the UE supports accessing 5GCN via RAT; or the UE disables N1 mode capability for 3GPP access and attempts to select a E-UTRAN cell if the EMF indicates that ESFB is not supported in RAT either; or the UE does not support accessing 5GCN via RAT.

If the EMC indicates that the emergency services are supported in RAT only and if the UE does not support ESFB or the ESFB is N, it may be desirable that:

the UE attempts to select a RAT cell if the UE supports accessing 5GCN via RAT; or the UE disables N1 mode capability for 3GPP access and attempts to select an E-UTRAN cell if the UE does not support accessing 5GCN via RAT.

The UE's attempt to select a RAT cell connected to 5GCN may fail. In the failure case, the UE may attempt to select an E-UTRAN cell.

The UE's attempt to select an E-UTRAN cell may fail. Even if there is no need to address the failure case because it is outside the scope of the subclause, the specification should not be described as if the success is guaranteed.

Establishment of the emergency call via E-UTRAN may be performed if the EMC BS is set to "emergency bearer services in S1 mode supported". If the EPS does not support emergency bearer services, the UE might try e.g. CS, but it is outside of the scope of the subclause.

It is proposed to reflect these changes by amending subclause U.2.2.6.4 of 3GPP TS 24.229 to recite:

"U.2.2.6.4 Emergency service in single registration mode

NOTE: This subclause covers only the case where the UE selects the IM CN subsystem in accordance with the conventions and rules specified in 3GPP TS 23.167 [4B] and describes the IP-CAN specific procedure. It does not preclude the use of CS domain and the use of CS domain is outside the scope of this subclause.

When the UE operates in single registration mode as described in 3GPP TS 24.501 [258] and the UE recognises that a call request is an emergency call, if:

the IM CN subsystem is selected in accordance with the conventions and rules specified in 3GPP TS 23.167 [4B]; and the UE is currently registered to the 5GS services while the UE is in an NR cell connected to 5GCN;

then the following treatment is applied:

1) if the EMC indicates "Emergency services not supported":

a) if the UE supports Emergency Services Fallback as specified in 3GPP TS 23.501 [257] and the emergency services fallback is available (i.e., "ESFB is Y" as described in 3GPP TS 23.167 [4B]), the UE shall attempt emergency call by triggering emergency services fallback as specified in 3GPP TS 24.501 [258];

b) if the UE supports Emergency Services Fallback as specified in 3GPP TS 23.501 [257] and the emergency services fallback is not available (i.e., "ESFB is N" as described in 3GPP TS 23.167 [4B]), the UE shall:

attempt to select an E-UTRA cell connected to 5GCN if the EMF is set to "Emergency service fallback supported in E-UTRA connected to 5GCN only" and the UE is capable of accessing 5GCN via E-UTRA. If the UE finds a suitable E-UTRA cell connected to 5GCN, the UE shall attempt emergency call by triggering emergency services fallback as specified in 3GPP TS 24.501 [258] via E-UTRA connected to 5GCN.

Otherwise if the UE does not find a suitable E-UTRA cell connected to 5GCN, the UE shall attempt to select an E-UTRA cell connected to EPC. If the UE finds a suitable E-UTRA cell connected to EPC, the UE shall perform an IP-CAN specific procedure as described in annex L to establish the emergency call if the network indicates in the TRACKING AREA UPDATE ACCEPT message that EMC BS is set to "emergency bearer services in S1 mode supported" as described in 3GPP TS 24.301 [8J]; or disable the N1 mode capability for 3GPP access as specified in 3GPP TS 24.501 [257] and attempt to select an E-UTRA cell connected to EPC if the EMF is not set to "Emergency service fallback supported in E-UTRA connected to 5GCN only" or the UE is not capable of accessing 5GCN via E-UTRA. If the UE finds a suitable E-UTRA cell connected to EPC, the UE shall perform an IP-CAN specific procedure as described in annex L to establish the emergency call if the network indicates in the TRACKING AREA UPDATE ACCEPT message that EMC BS is set to "emergency bearer services in S1 mode supported" as described in 3GPP TS 24.301 [8J]; and c) if the UE does not support Emergency Services Fallback as specified in 3GPP TS 23.501 [257], the UE shall disable the N1 mode capability for 3GPP access as specified in 3GPP TS 24.501 [257] and attempt to select an E-UTRA cell connected to EPC. If the UE finds a suitable E-UTRA cell connected to EPC, the UE shall perform an IP-CAN specific procedure as described in annex L to establish the emergency call if the network indicates in the TRACKING AREA UPDATE ACCEPT message that EMC BS is set to "emergency bearer services in S1 mode supported" as described in 3GPP TS 24.301 [8J];

2) if the EMC indicates "Emergency services supported in E-UTRA connected to 5GCN only":

a) if the UE supports Emergency Services Fallback as specified in 3GPP TS 23.501 [257] and the emergency services fallback is available (i.e., "ESFB is Y" as described in 3GPP TS 23.167 [4B]), the UE shall attempt emergency call by triggering emergency services fallback as specified in 3GPP TS 24.501 [258]; and b) if the UE does not support Emergency Services Fallback as specified in 3GPP TS 23.501 [257] or the emergency services fallback is not available (i.e., "ESFB is N" as described in 3GPP TS 23.167 [4B]), the UE shall:

attempt to select an E-UTRA cell connected to 5GCN if the UE is capable of accessing 5GCN via E-UTRA. If the UE finds a suitable E-UTRA cell connected to 5GCN, the UE shall attempt emergency call by triggering PDU session establishment for emergency service as specified in 3GPP TS 24.501 [258] via E-UTRA connected to 5GCN.

Otherwise if the UE does find a suitable E-UTRA cell connected to 5GCN, the UE shall attempt to select an E-UTRA cell connected to EPC. If the UE finds a suitable E-UTRA cell connected to EPC, the UE shall perform an IP-CAN specific procedure as described in annex L to establish the emergency call if the network indicates in the TRACKING AREA UPDATE ACCEPT message that EMC BS is set to "emergency bearer services in S1 mode supported" as described in 3GPP TS 24.301 [8J]; or disable the N1 mode capability for 3GPP access as specified in 3GPP TS 24.501 [257] and attempt to select an E-UTRA cell connected to EPC if the UE is not capable of accessing 5GCN via E-UTRA. If the UE finds a suitable E-UTRA cell connected to EPC, the UE shall perform an IP-CAN specific procedure as described in annex L to establish the emergency call if the network indicates in the TRACKING AREA UPDATE ACCEPT message that EMC BS is set to "emergency bearer services in S1 mode supported" as described in 3GPP TS 24.301 [8J]; and 3) if the EMC indicates "Emergency services supported in NR connected to 5GCN only" or "Emergency services supported in NR connected to 5GCN and E-UTRA connected to 5GCN", the UE shall attempt emergency call by triggering PDU session establishment for emergency service as specified in 3GPP TS 24.501 [258].

When the UE operates in single registration mode as described in 3GPP TS 24.501 [258] and the UE recognises that a call request is an emergency call, if:

the IM CN subsystem is selected in accordance with the conventions and rules specified in 3GPP TS 23.167 [4B]; and the UE is currently registered to the 5GS services while the UE is in an E-UTRA cell connected to 5GCN;

then the following treatment is applied:

1) if the EMC indicates "Emergency services not supported":

a) if the UE supports Emergency Services Fallback as specified in 3GPP TS 23.501 [257] and the emergency services fallback is available (i.e., "ESFB is Y" as described in 3GPP TS 23.167 [4B]), the UE shall attempt emergency call by triggering emergency services fallback as specified in 3GPP TS 24.501 [258];

b) if the UE supports Emergency Services Fallback as specified in 3GPP TS 23.501 [257] and the emergency services fallback is not available (i.e., "ESFB is N" as described in 3GPP TS 23.167 [4B]), the UE shall:

attempt to select an NR cell connected to 5GCN if the EMF is set to "Emergency service fallback supported in NR connected to 5GCN only" and the UE is capable of accessing 5GCN via NR. If the UE finds a suitable NR cell connected to 5GCN, the UE shall attempt emergency call by triggering emergency services fallback as specified in 3GPP TS 24.501 [258] via NR connected to 5GCN.

Otherwise if the UE does not find a suitable NR cell connected to 5GCN, the UE shall attempt to select an E-UTRA cell connected to EPC. If the UE finds a suitable E-UTRA cell connected to EPC, the UE shall perform an IP-CAN specific procedure as described in annex L to establish the emergency call if the network indicates in the TRACKING AREA UPDATE ACCEPT message that EMC BS is set to "emergency bearer services in S1 mode supported" as described in 3GPP TS 24.301 [8J]; or disable the N1 mode capability for 3GPP access as specified in 3GPP TS 24.501 [257] and attempt to select an E-UTRA cell connected to EPC if the EMF is not set to "Emergency service fallback supported in NR connected to 5GCN only" or the UE is not capable of accessing 5GCN via NR. If the UE finds a suitable E-UTRA cell connected to EPC, the UE shall perform an IP-CAN specific procedure as described in annex L to establish the emergency call if the network indicates in the TRACKING AREA UPDATE ACCEPT message that EMC BS is set to "emergency bearer services in S1 mode supported" as described in 3GPP TS 24.301 [8J]; and c) if the UE does not support Emergency Services Fallback as specified in 3GPP TS 23.501 [257], the UE shall disable the N1 mode capability for 3GPP access as specified in 3GPP TS 24.501 [257] and attempt to select an E-UTRA cell connected to EPC. If the UE finds a suitable E-UTRA cell connected to EPC, the UE shall perform an IP-CAN specific procedure as described in annex L to establish the emergency call if the network indicates in the TRACKING AREA UPDATE ACCEPT message that EMC BS is set to "emergency bearer services in S1 mode supported" as described in 3GPP TS 24.301 [8J];

2) if the EMC indicates "Emergency services supported in NR connected to 5GCN only":

a) if the UE supports Emergency Services Fallback as specified in 3GPP TS 23.501 [257] and the emergency services fallback is available (i.e., "ESFB is Y" as described in 3GPP TS 23.167 [4B]), the UE shall attempt emergency call by triggering emergency services fallback as specified in 3GPP TS 24.501 [258]; and b) if the UE does not support Emergency Services Fallback as specified in 3GPP TS 23.501 [257] or the emergency services fallback is not available (i.e., "ESFB is N" as described in 3GPP TS 23.167 [4B]), the UE shall:

attempt to select an NR cell connected to 5GCN if the UE is capable of accessing 5GCN via NR. If the UE finds a suitable NR cell connected to 5GCN, the UE shall attempt emergency call by triggering PDU session establishment for emergency service as specified in 3GPP TS 24.501 [258] via NR connected to 5GCN to establish the emergency call.

Otherwise if the UE does not find a suitable NR cell connected to 5GCN, the UE shall attempt to select an E-UTRA cell connected to EPC. If the UE finds a suitable E-UTRA cell connected to EPC, the UE shall perform an IP-CAN specific procedure as described in annex L to establish the emergency call if the network indicates in the TRACKING AREA UPDATE ACCEPT message that EMC BS is set to "emergency bearer services in S1 mode supported" as described in 3GPP TS 24.301 [8J]; or disable the N1 mode capability for 3GPP access as specified in 3GPP TS 24.501 [257] and attempt to select an E-UTRA cell connected to EPC if the UE is not capable of accessing 5GCN via NR. If the UE finds a suitable E-UTRA cell connected to EPC, the UE shall perform an IP-CAN specific procedure as described in annex L to establish the emergency call if the network indicates in the TRACKING AREA UPDATE ACCEPT message that EMC BS is set to "emergency bearer services in S1 mode supported" as described in 3GPP TS 24.301 [8J]; and 3) if the EMC indicates "Emergency services supported in E-UTRA connected to 5GCN only" or "Emergency services supported in NR connected to 5GCN and E-UTRA connected to 5GCN", the UE shall attempt emergency call by triggering PDU session establishment for emergency service as specified in 3GPP TS 24.501 [258]".

Subclause U.2.2.6.4 of 3GPP TS 24.229 is silent as to how the UE in DR mode operates according to the EMC and EMF indicators and UE's support of ESFB when a UE is in a cell of a specific access technology. One or more of the following embodiments address this issue.

In summary, if the EMC indicates "Emergency services not supported", the UE may perform an IP-CAN specific procedure as described in annex L to establish the emergency call.

If the UE is in an NR cell connected to 5GCN, the EMC may indicate that emergency services are supported only via E-UTRA connected to 5GCN, the UE supports ESFB, ESFB is Y, and the UE is capable of accessing 5GCN via E-UTRA, the UE may perform ESFB.

If the UE is in an E-UTRA cell connected to 5GCN, the EMC indicates that emergency services are supported only via NR connected to 5GCN, the UE supports ESFB, ESFB is Y, and the UE is capable of accessing 5GCN via NR, the UE may perform an IP-CAN specific procedure as described in annex L to establish the emergency call.

If the EMC indicates that emergency services are supported only via the different RAT to the RAT of the cell that the UE is camping in, ESFB is not available in the UE or network, and the UE is capable of accessing 5GCN via the different RAT, the UE may attempt to perform emergency call by triggering PDU session establishment for emergency service via the different RAT.

If the attempt fails, the UE may perform an IP-CAN specific procedure as described in annex L to establish the emergency call.

If the EMC indicates that emergency services are supported only via the different RAT to the RAT of the cell that the UE is camping in and the UE is not capable of accessing 5GCN via the different RAT, the UE may perform an IP-CAN specific procedure as described in annex L to establish the emergency call.

If the emergency services are supported in the current RAT, the UE may attempt emergency call by triggering PDU session establishment for emergency service.

It is proposed to reflect these changes by adding a subclause U.2.2.6.x to 3GPP TS 24.229.

"U.2.2.6.x Emergency service in dual registration mode

NOTE: This subclause covers only the case where the UE selects the IM CN subsystem in accordance with the conventions and rules specified in 3GPP TS 23.167 [4B] and describes the IP-CAN specific procedure. It does not preclude the use of CS domain and the use of CS domain is outside the scope of this subclause.

When the UE operates in dual registration mode as described in 3GPP TS 24.501 [258] and the UE recognises that a call request is an emergency call, if:

the IM CN subsystem is selected in accordance with the conventions and rules specified in 3GPP TS 23.167 [4B]; and the UE is currently registered to the 5GS services while the UE is in an NR cell connected to 5GCN;

then the following treatment is applied:

1) if the EMC indicates "Emergency services not supported", the UE shall:
   a) perform an IP-CAN specific procedure as described in annex L to establish the emergency call if the UE is attached for EPS services and the network provided the UE with the EMC BS set to "emergency bearer services in S1 mode supported" as described in 3GPP TS 24.301 [8J]; or
   b) attempt to select an E-UTRA cell connected to EPC if the UE is not attached for EPS services. If the UE finds a suitable E-UTRA cell connected to EPC, the UE shall perform an IP-CAN specific procedure as described in annex L to establish the emergency call if the network provides the UE with the EMC BS set to "emergency bearer services in S1 mode supported" as described in 3GPP TS 24.301 [8J];

2) if the EMC indicates "Emergency services supported in E-UTRA connected to 5GCN only":
   a) if the UE supports emergency services fallback as specified in 3GPP TS 23.501 [257] and the emergency services fallback is available (i.e., "ESFB is Y" as described in 3GPP TS 23.167 [4B]), and if the UE is capable of accessing 5GCN via E-UTRA, the UE shall attempt emergency call by triggering emergency services fallback as specified in 3GPP TS 24.501 [258];
   b) if the UE does not support emergency services fallback as specified in 3GPP TS 23.501 [257] or the emergency services fallback is not available (i.e., "ESFB is N" as described in 3GPP TS 23.167 [4B]), and if the UE is capable of accessing 5GCN via E-UTRA, the UE shall attempt to select an E-UTRA cell connected to 5GCN. If the UE finds a suitable E-UTRA cell connected to 5GCN, the UE shall perform emergency call by triggering PDU session establishment for emergency service as specified in 3GPP TS 24.501 [258] via E-UTRA connected to 5GCN.
      Otherwise if the UE cannot find a suitable E-UTRA cell connected to 5GCN, the UE shall:
         perform an IP-CAN specific procedure as described in annex L to establish the emergency call if the UE is attached for EPS services and the network provided the UE with the EMC BS set to "emergency bearer services in S1 mode supported" as described in 3GPP TS 24.301 [8J]; or
         attempt to select an E-UTRA cell connected to EPC if the UE is not attached for EPS services. If the UE finds a suitable E-UTRA cell connected to EPC, the UE shall perform an IP-CAN specific procedure as described in annex L to establish the emergency call the network provides the UE with the EMC BS set to "emergency bearer services in S1 mode supported" as described in 3GPP TS 24.301 [8J]; or
   c) if the UE is not capable of accessing 5GCN via E-UTRA, the UE shall:
      perform an IP-CAN specific procedure as described in annex L to establish the emergency call if the UE is attached for EPS services and the network provided the UE with the EMC BS set to "emergency bearer services in S1 mode supported" as described in 3GPP TS 24.301 [8J]; or
      attempt to select an E-UTRA cell connected to EPC if the UE is not attached for EPS services. If the UE finds a suitable E-UTRA cell connected to EPC, the UE shall perform an IP-CAN specific procedure as described in annex L to establish the emergency call the network provides the UE with the EMC BS set to "emergency bearer services in S1 mode supported" as described in 3GPP TS 24.301 [8J]; or 3) if the EMC indicates "Emergency services supported in NR connected to 5GCN only" or "Emergency services supported in NR connected to 5GCN and E-UTRA connected to 5GCN", the UE shall attempt emergency call by triggering PDU session establishment for emergency service as specified in 3GPP TS 24.501 [258].

When the UE operates in dual registration mode as described in 3GPP TS 24.501 [258] and the UE recognises that a call request is an emergency call, if:

the IM CN subsystem is selected in accordance with the conventions and rules specified in 3GPP TS 23.167 [4B]; and the UE is currently registered to the 5GS services while the UE is in an E-UTRA cell connected to 5GCN;

then the following treatment is applied:

1) if the EMC indicates "Emergency services not supported", the UE shall:
   a) perform an IP-CAN specific procedure as described in annex L to establish the emergency call if the UE is attached for EPS services and the network provided the UE with the EMC BS set to "emergency bearer services in S1 mode supported" as described in 3GPP TS 24.301 [8J]; or
   b) attempt to select an E-UTRA cell connected to EPC if the UE is not attached for EPS services. If the UE finds a suitable E-UTRA cell connected to EPC, the UE shall perform an IP-CAN specific procedure as described in annex L to establish the emergency call if the network provides the UE with the EMC BS set to "emergency bearer services in S1 mode supported" as described in 3GPP TS 24.301 [8J];

2) if the EMC indicates "Emergency services supported in NR connected to 5GCN only":
   a) if the UE is capable of accessing 5GCN via NR, the UE shall attempt to select an NR cell connected to 5GCN. If the UE finds a suitable NR cell connected to 5GCN, the UE shall perform emergency call by triggering PDU session establishment for emergency service as specified in 3GPP TS 24.501 [258] via NR connected to 5GCN.
      Otherwise if the UE cannot find a suitable NR cell connected to 5GCN, the UE shall:

perform an IP-CAN specific procedure as described in annex L to establish the emergency call if the UE is attached for EPS services and the network provided the UE with the EMC BS set to "emergency bearer services in S1 mode supported" as described in 3GPP TS 24.301 [8J]; or attempt to select an E-UTRA cell connected to EPC if the UE is not attached for EPS services. If the UE finds a suitable E-UTRA cell connected to EPC, the UE shall perform an IP-CAN specific procedure as described in annex L to establish the emergency call if the network provides the UE with the EMC BS set to "emergency bearer services in S1 mode supported" as described in 3GPP TS 24.301 [8J]; or:

c) if the UE is not capable of accessing 5GCN via NR, the UE shall:

perform an IP-CAN specific procedure as described in annex L to establish the emergency call if the UE is attached for EPS services and the network provided the UE with the EMC BS set to "emergency bearer services in S1 mode supported" as described in 3GPP TS 24.301 [8J]; or attempt to select an E-UTRA cell connected to EPC if the UE is not attached for EPS services. If the UE finds a suitable E-UTRA cell connected to EPC, the UE shall perform an IP-CAN specific procedure as described in annex L to establish the emergency call the network provides the UE with the EMC BS set to "emergency bearer services in S1 mode supported" as described in 3GPP TS 24.301 [8J]; or 3) if the EMC indicates "Emergency services supported in E-UTRA connected to 5GCN only" or "Emergency services supported in NR connected to 5GCN and E-UTRA connected to 5GCN", the UE shall attempt emergency call by triggering PDU session establishment for emergency service as specified in 3GPP TS 24.501 [258]".

Figure 3:
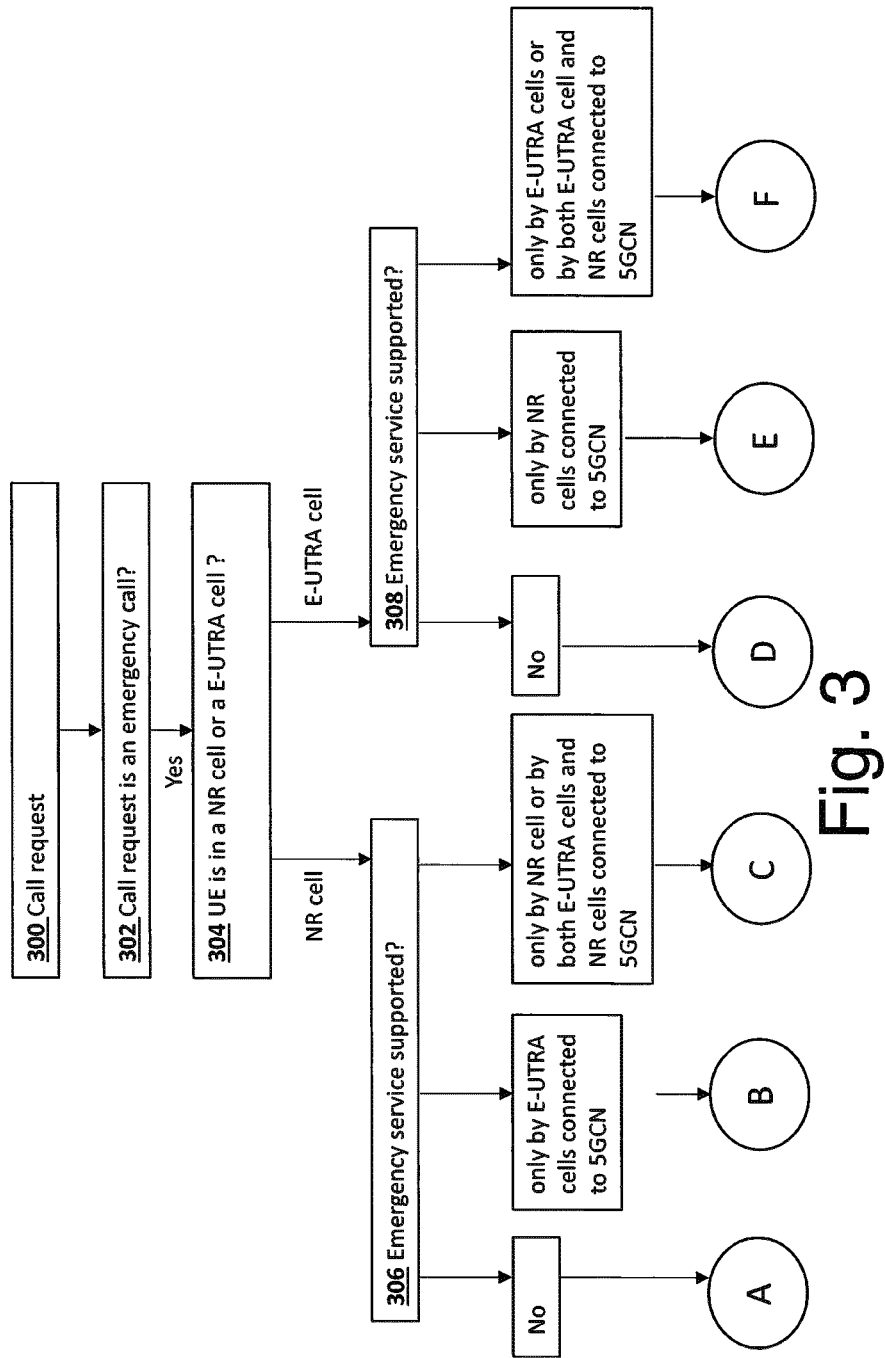
FIG. 3 shows a schematic representation of a diagram of a method performed by a communication device when the communication device operates in SR mode.

FIG. 3 shows a schematic representation of a diagram of a method performed by a UE when the UE operates in SR mode.

In step 300, the UE receives a call request from a user.

In step 302, the UE determines that the call request is an emergency call request.

In step 304, the UE determines whether the UE is camping in an NR cell or in an E-UTRA cell. If the UE is camping in an NR cell, the method goes to step 306. If the UE is camping in an E-UTRAN the method goes to step 308.

In step 306 (i.e. the UE is camping in an NR cell), the UE determines whether emergency services are supported by NR cells connected to 5GCN, for example based on an EMC. The EMC may be provided by an access and mobility management function (AMF) in 5GCN to the UE via non-access stratum (NAS) signalling in a REGISTRATION ACCEPT message. Likewise, the UE determines whether emergency services are supported by E-UTRAN cells connected to 5GCN, for example based on the EMC.

Figure 4:
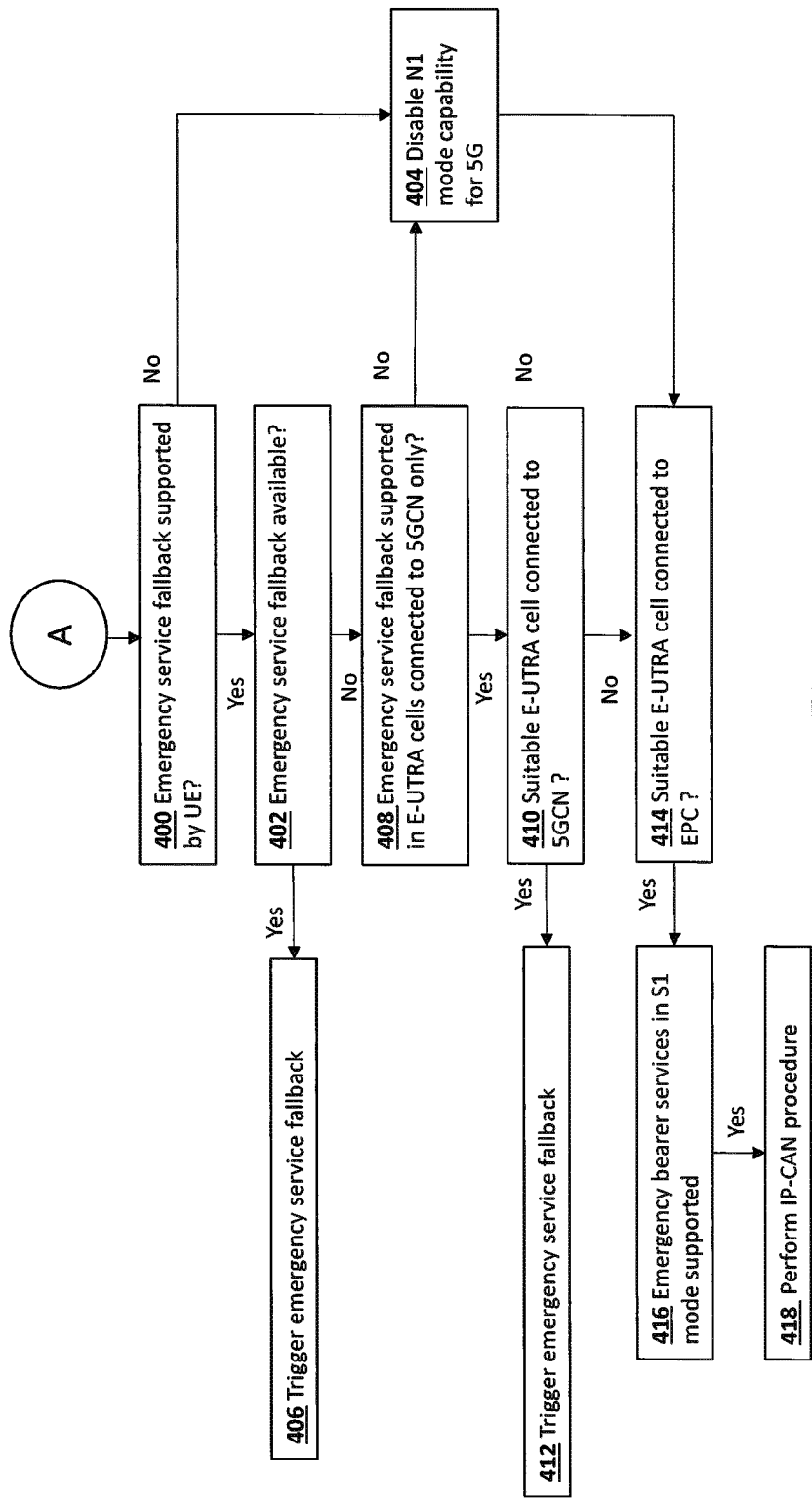
FIG. 4 shows a schematic representation of a diagram of a method performed by a communication device when the communication device in an NR cell operates in SR mode and emergency services are supported neither by E-UTRA cells connected to the 5GCN nor by NR cells connected to the 5GCN.

If the EMC indicates that emergency services are supported by none of NR cells connected to 5GCN and E-UTRAN cells connected to 5GCN, the method proceeds to step A (linking FIG. 3 to FIG. 4). If the EMC indicates that emergency services are supported by E-UTRAN cells connected to 5GCN only, the method proceeds to step B (linking FIG. 3 to FIG. 5). If the EMC indicates that emergency services are supported by NR cells connected to 5GCN only or both NR cells connected to 5GCN and E-UTRAN cells connected to 5GCN, the method proceeds to step C (linking FIG. 3 to FIG. 6).

In step 308 (i.e. the UE is camping in an E-UTRAN cell), the UE determines whether emergency services are supported by NR cells connected to 5GCN, for example based on the EMC. Likewise, the UE determines whether emergency services are supported by E-UTRAN cells connected to 5GCN, for example based on the EMC.

If the EMC indicates that emergency services are supported by none of NR cells connected to 5GCN and E-UTRAN cells connected to 5GCN, the method proceeds to step D (linking FIG. 3 to FIG. 7). If the EMC indicates that emergency services are supported by NR cells connected to 5GCN only, the method proceeds to step E (linking FIG. 3 to FIG. 8). If the EMC indicates that emergency services are supported by E-UTRAN cells connected to 5GCN only or both NR cells connected to 5GCN and E-UTRAN cells connected to 5GCN, the method proceeds to step F (linking FIG. 3 to FIG. 9).

FIG. 4 shows a schematic representation of a diagram of a method performed by a UE when the UE camping in an NR cell operates in SR mode and emergency services are supported neither by E-UTRA cells connected to the 5GCN nor by NR cells connected to the 5GCN.

In step 400, the UE determines whether the UE supports an emergency services fallback procedure. If the UE supports the emergency services fallback procedure, the method goes to step 402. If the UE does not support the emergency services fallback procedure, the method goes to 404.

In step 402, the UE determines whether the emergency services fallback procedure is available, for example based on an ESFB. If the ESFB indicates the emergency services fallback procedure is available, the method goes to step 406. If the ESFB indicates that the emergency services fallback procedure is not available, the method goes to 408.

In step 406 (i.e. the emergency services fallback procedure is available), the UE attempts to perform an emergency call by triggering an emergency services fallback procedure.

In step 408 (i.e. the emergency services fallback procedure is not available), the UE determines whether the emergency service fallback procedure is supported by E-UTRA cells connected to 5GCN only, for example based on an EMF. The EMF may be provided by an access and mobility management function (AMF) in 5GCN to the UE via non-access stratum (NAS) signalling in a REGISTRATION ACCEPT message. If the EMF indicates that the emergency service fallback procedure is supported by E-UTRA cells connected to 5GCN only, the method goes to step 410. If the EMF indicates that the emergency service fallback procedure is not supported by E-UTRA cells connected to 5GCN only, the method goes to step 404.

In step 410 (i.e. the emergency service fallback procedure is supported by E-UTRA cells connected to 5GCN only), the UE determines whether the UE supports accessing 5GCN via an E-UTRA cell and whether there is a suitable E-UTRA cell connected to 5GCN accessible by the UE. For example, the UE may determine whether the UE has a E-UTRA radio stack, whether the UE is within the coverage area of an E-UTRA cell connected to 5GCN, whether the load of the E-UTRA cell connected to 5GCN meets a predefined requirement, whether radio link between the UE and the E-UTRA cell connected to 5GCN meets a predefined requirement, or other.

In general, a suitable cell for a UE may be defined as a cell that the UE may camp. More detailed criteria include (non-exhaustive): the cell is part of either the selected PLMN or a PLMN of the equivalent PLMN list; the cell selection criteria are fulfilled; a cell is served by the selected/registered PLMN and not barred; in multi-beam operations, measurement quantity of a cell is derived amongst the beams corresponding to the same cell (applicable to NR only), etc.

If there is a suitable E-UTRA cell connected to 5GCN accessible by the UE, the method goes to step 412. If there is no suitable E-UTRA cell connected to 5GCN accessible by the UE, the method goes to step 404 or 414.

In step 412, the UE attempts to select the suitable E-UTRA cell connected to 5GCN accessible by the UE and trigger an emergency services fallback procedure.

In step 414, the UE determines the UE supports accessing EPC via an E-UTRA cell and whether there is a suitable E-UTRA cell connected to EPC accessible by the UE. For example, the UE may determine whether the UE has a E-UTRA radio stack, the UE may determine whether the UE is within the coverage area of an E-UTRA cell connected to EPC, whether the load of the E-UTRA cell connected to EPC meets a predefined requirement, whether radio link between the UE and the E-UTRA cell connected to EPC meets a predefined requirement, or other. If the UE determines that the UE supports accessing EPC via an E-UTRA cell and there is a suitable E-UTRA cell connected to EPC accessible by the UE, the method goes to step 416.

In step 416 (i.e. there is a suitable E-UTRA cell connected to EPC accessible by the UE), the UE determines whether emergency bearer services are supported, for example based on an EMC BS. The EMC BS may be provided by the mobility management entity (MME) in EPC via NAS signalling in a TRACKING AREA UPDATE ACCEPT message or an ATTACH ACCEPT message.

If the EMC BS indicates that emergency bearer services in S1 mode are supported, the method goes to step 418.

In step 418 (i.e. emergency bearer services in S1 mode are supported), the UE attempts to select the suitable E-UTRA cell connected to EPC and perform an emergency call by performing an IP-CAN procedure.

In step 404 (i.e. the UE does not support the emergency services fallback procedure or the emergency services fallback procedure is not supported by E-UTRA cells connected to 5GCN only or there is no suitable E-UTRA cell connected to 5GCN), the UE disables 5G capability, for example the UE disables N1 mode capability. The method then goes to step 414.

Figure 5:
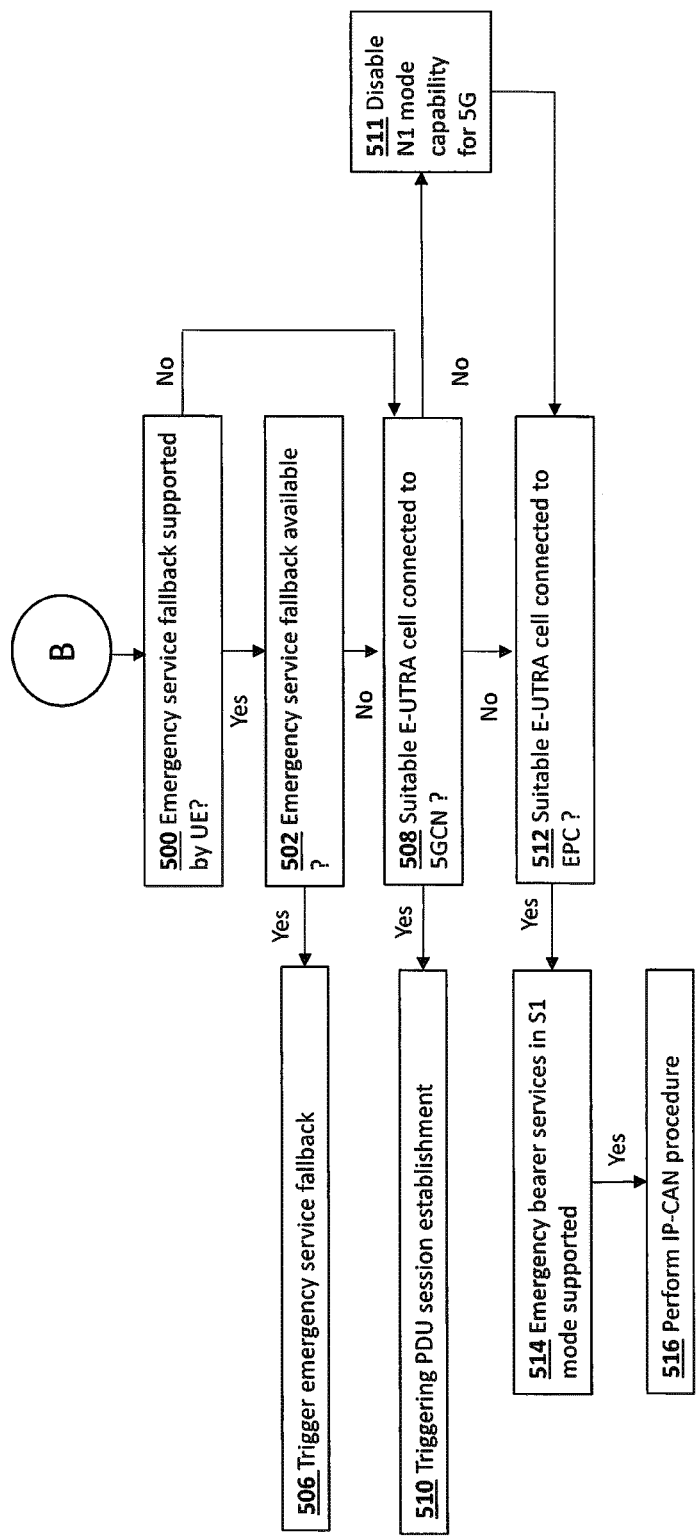
FIG. 5 shows a schematic representation of a diagram of a method performed by a communication device when the communication device in an NR cell operates in SR mode and emergency services are supported by E-UTRA cells connected to a 5GCN only.

FIG. 5 shows a schematic representation of a diagram of a method performed by a UE when the UE camping in an NR cell operates in SR mode and emergency services are supported by E-UTRA cells connected to the 5GCN only.

In step 500, the UE determines whether the UE supports an emergency services fallback procedure. If the UE supports the emergency services fallback procedure, the method goes to step 502. If the UE does not support the emergency services fallback procedure, the method goes to 508.

In step 502, the UE determines whether the emergency services fallback procedure is available, for example based on the ESFB. If the ESFB indicates the emergency services fallback procedure is available, the method goes to step 506. If the ESFB indicates that the emergency services fallback procedure is not available, the method goes to 508.

In step 506 (i.e. the emergency services fallback procedure is available), the UE attempts to perform an emergency call by triggering an emergency services fallback procedure.

In step 508 (i.e. the UE does not support the emergency services fallback procedure or the emergency services fallback procedure is not available), the UE determines whether the UE supports accessing 5GCN via a E-UTRA cell and whether there is a suitable E-UTRA cell connected to 5GCN accessible by the UE. If there is a suitable E-UTRA cell connected to 5GCN accessible by the UE, the method goes to step 510. If there is no suitable E-UTRA cell connected to 5GCN accessible by the UE, the method goes to step 511 or 512.

In step 510, the UE attempts to select the suitable E-UTRA cell connected to 5GCN accessible by the UE and trigger a PDU session establishment procedure.

In step 512, the UE determines whether the UE supports accessing EPC via an E-UTRA cell and whether there is a suitable E-UTRA cell connected to EPC accessible by the UE. If the UE determines that there is a suitable E-UTRA cell connected to EPC accessible by the UE, the method goes to step 514.

In step 514 (i.e. there is a suitable E-UTRA cell connected to EPC accessible by the UE), the UE determines whether emergency bearer services are supported, for example based on an EMC BS. The EMC BS may be provided by the mobility management entity (MME) in EPC via NAS signalling in a TRACKING AREA UPDATE ACCEPT message or an ATTACH ACCEPT message. If the EMC BS indicates that emergency bearer services in S1 mode are supported, the method goes to step 516.

In step 516 (i.e. emergency bearer services in S1 mode are supported), the UE attempts to select the suitable E-UTRA cell connected to EPC and perform an emergency call by performing an IP-CAN procedure.

In step 511 (i.e. there is no suitable E-UTRA cell connected to 5GCN), the UE disables 5G capability, for example the UE disables N1 mode capability. The method then goes to step 512.

Figure 6:
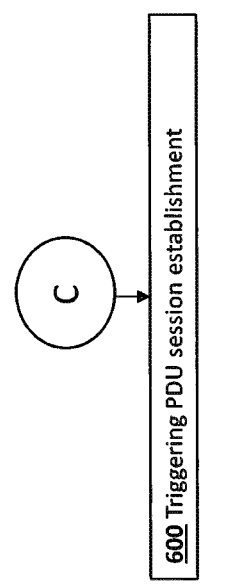
FIG. 6 shows a schematic representation of a diagram of a method performed by a communication device when the communication device in an NR cell operates in SR mode and emergency services are supported by NR cells connected to the 5GCN only or supported by both NR cells and E-UTRA cells connected to the 5GCN.

FIG. 6 shows a schematic representation of a diagram of a method performed by a UE when the UE camping in an NR cell operates in SR mode and emergency services are supported by NR cells connected to the 5GCN only or supported by both NR cells and E-UTRA cells connected to the 5GCN.

In step 600 the UE attempts to perform an emergency call by triggering a PDU session establishment procedure.

Figure 7:
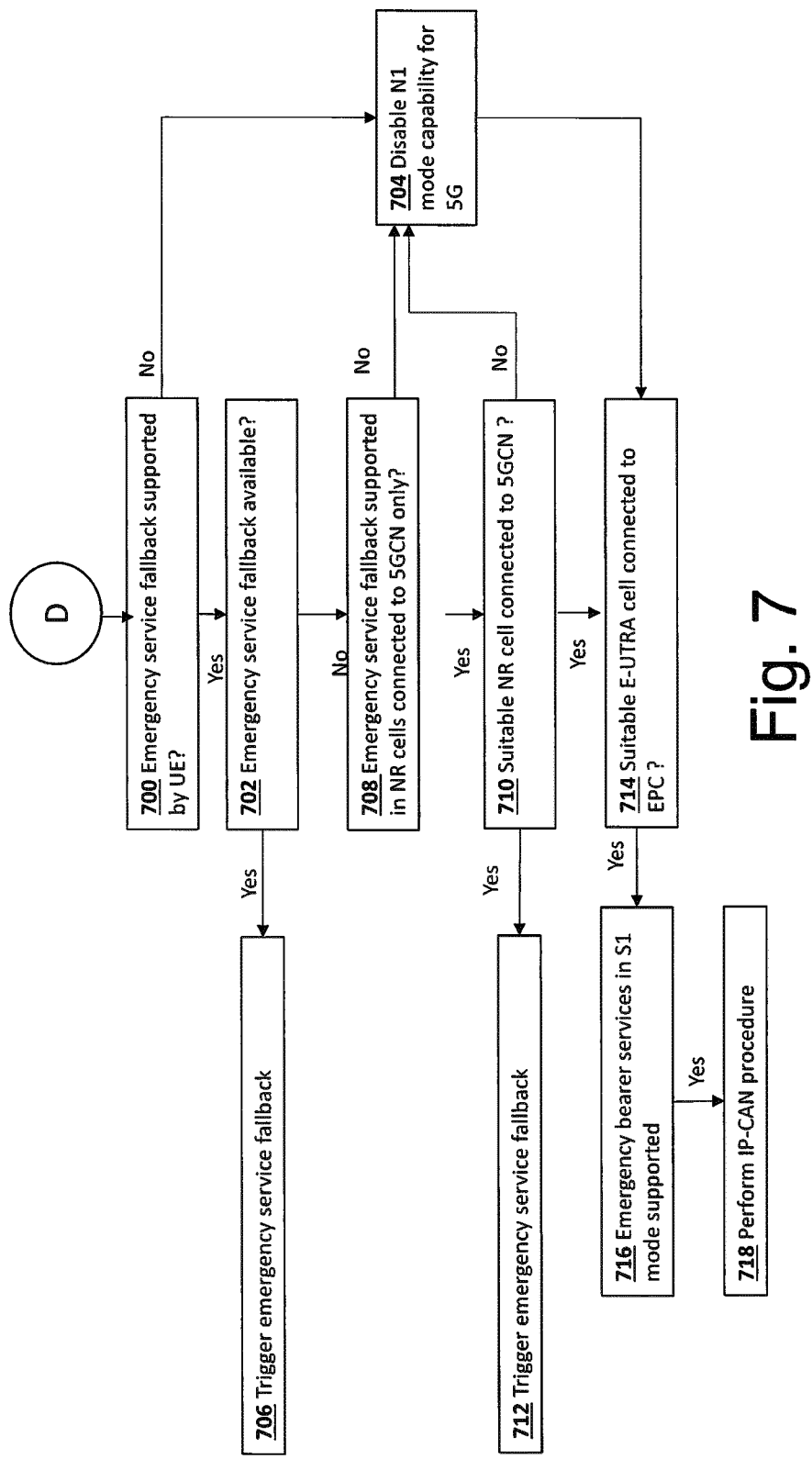
FIG. 7 shows a schematic representation of a diagram of a method performed by a communication device when the communication device in an E-UTRA cell operates in SR mode and emergency services are supported neither by E-UTRA cells connected to the 5GCN nor by NR cells connected to the 5GCN.

FIG. 7 shows a schematic representation of a diagram of a method performed by a UE when the UE camping in an E-UTRA cell operates in SR mode and emergency services are supported neither by E-UTRA cells connected to the 5GCN nor by NR cells connected to the 5GCN.

In step 700, the UE determines whether the UE supports an emergency services fallback procedure. If the UE supports the emergency services fallback procedure, the method goes to step 702. If the UE does not support the emergency services fallback procedure, the method goes to 704.

In step 702, the UE determines whether the emergency services fallback procedure is available, for example based on an ESFB. If the ESFB indicates the emergency services fallback procedure is available, the method goes to step 706. If the ESFB indicates that the emergency services fallback procedure is not available, the method goes to 708.

In step 706 (i.e. the emergency services fallback procedure is available), the UE attempts to perform an emergency call by triggering an emergency services fallback procedure.

In step 708 (i.e. the emergency services fallback procedure is not available), the UE determines whether the emergency service fallback procedure is supported by NR cells connected to 5GCN only, for example based on an EMF. If the EMF indicates that the emergency service fallback procedure is supported by NR cells connected to 5GCN only, the method goes to step 710. If the EMF indicates that the emergency service fallback procedure is not supported by NR cells connected to 5GCN only, the method goes to step 704.

In step 710 (i.e. the emergency service fallback procedure is supported by NR connected to 5GCN only), the UE determines whether the UE supports accessing 5GCN via an NR cell and whether there is a suitable NR cell connected to 5GCN accessible by the UE. For example, the UE may determine whether the UE has an NR radio stack, whether the UE is within the coverage area of an NR cell connected to 5GCN, whether the load of the NR cell connected to 5GCN meets a predefined requirement, whether radio link between the UE and the NR cell connected to 5GCN meets a predefined requirement, or other. If there is a suitable NR cell connected to 5GCN accessible by the UE, the method goes to step 712. If there is no suitable NR cell connected to 5GCN accessible by the UE, the method goes to step 704 or 714.

In step 712, the UE attempts to select the suitable E-UTRA cell connected to 5GCN accessible by the UE and trigger an emergency services fallback procedure.

In step 714, the UE determines whether the UE supports accessing EPC via an E-UTRA cell and whether there is a suitable E-UTRA cell connected to EPC accessible by the UE. For example, the UE may determine whether the UE has an E-UTRA radio stack, whether the UE is within the coverage area of an E-UTRA cell connected to EPC, whether the load of the E-UTRA cell connected to EPC meets a predefined requirement, whether radio link between the UE and the E-UTRA cell connected to EPC meets a predefined requirement, or other. If the UE determines that there is a suitable E-UTRA cell connected to EPC accessible by the UE, the method goes to step 716.

In step 716 (i.e. there is a suitable E-UTRA cell connected to EPC accessible by the UE), the UE determines whether emergency bearer services are supported, for example based on an EMC BS in a TRACKING AREA UPDATE ACCEPT message. If the EMC BS indicates that emergency bearer services in S1 mode are supported, the method goes to step 718.

In step 718 (i.e. emergency bearer services in S1 mode are supported), the UE attempts to select the suitable E-UTRA cell connected to EPC and perform an emergency call by performing an IP-CAN procedure.

In step 704 (i.e. the UE does not support the emergency services fallback procedure or the emergency services fallback procedure is not supported by NR cells connected to 5GCN only or there is no suitable NR cell connected to 5GCN), the UE disables 5G capability, for example the UE disables N1 mode capability. The method then goes to step 714.

Figure 8:
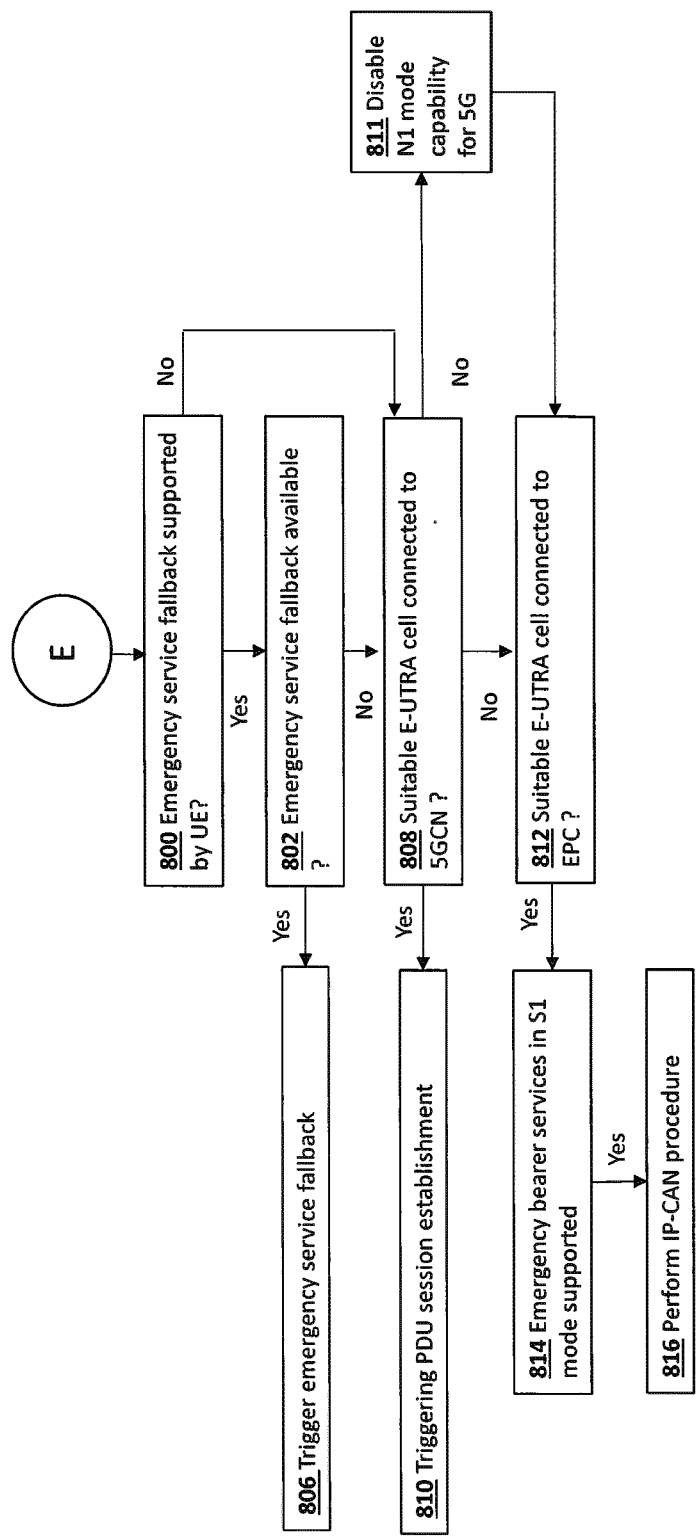
FIG. 8 shows a schematic representation of a diagram of a method performed by a communication device when the communication device in an E-UTRA cell operates in SR mode and emergency services are supported by NR cells connected to a 5GCN only.

FIG. 8 shows a schematic representation of a diagram of a method performed by a UE when the UE camping in an NR cell operates in SR mode and emergency services are supported by NR cells connected to the 5GCN only.

In step 800, the UE determines whether the UE supports an emergency services fallback procedure. If the UE supports the emergency services fallback procedure, the method goes to step 802. If the UE does not support the emergency services fallback procedure, the method goes to step 808.

In step 802, the UE determines whether the emergency services fallback procedure is available, for example based on the ESFB. If the ESFB indicates the emergency services fallback procedure is available, the method goes to step 806. If the ESFB indicates that the emergency services fallback procedure is not available, the method goes to step 808.

In step 806 (i.e. the emergency services fallback procedure is available), the UE attempts to perform an emergency call by triggering an emergency services fallback procedure.

In step 508 (i.e. the UE does not support the emergency services fallback procedure or the emergency services fallback procedure is not available), the UE determines whether the UE supports accessing 5GCN via an NR cell and whether there is a suitable NR cell connected to 5GCN accessible by the UE. If there is a suitable NR cell connected to 5GCN accessible by the UE, the method goes to step 810. If there is no suitable E-UTRA cell connected to 5GCN accessible by the UE, the method goes to step 811 or 812.

In step 810, the UE attempts to select the suitable NR cell connected to 5GCN accessible by the UE and trigger a PDU session establishment procedure.

In step 812, the UE determines whether there is a suitable NR cell connected to EPC accessible by the UE. If the UE determines that there is a suitable NR cell connected to EPC accessible by the UE, the method goes to step 814.

In step 814 (i.e. there is a suitable E-UTRA cell connected to EPC accessible by the UE), the UE determines whether emergency bearer services are supported, for example based on an EMC BS in a TRACKING AREA UPDATE ACCEPT message. If the EMC BS indicates that emergency bearer services in S1 mode are supported, the method goes to step 816.

In step 816 (i.e. emergency bearer services in S1 mode are supported), the UE attempts to select the suitable NR cell connected to EPC and perform an emergency call by performing an IP-CAN procedure.

In step 811 (i.e. there is no suitable NR cell connected to 5GCN), the UE disables 5G capability, for example the UE disables N1 mode capability. The method then goes to step 512.

Figure 9:
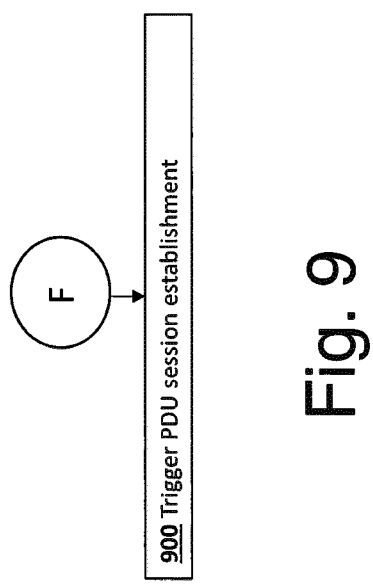
FIG. 9 shows a schematic representation of a diagram of a method performed by a communication device when the communication device in an E-UTRA cell operates in SR mode and emergency services are supported by E-UTRA cells connected to the 5GCN only or supported by both NR cells and E-UTRA cells connected to the 5GCN.

FIG. 9 shows a schematic representation of a diagram of a method performed by a UE when the UE camping in an NR cell operates in SR mode and emergency services are supported by NR cells connected to the 5GCN only or supported by both NR cells and E-UTRA cells connected to the 5GCN.

In step 900 the UE attempts to perform an emergency call by triggering a PDU session establishment procedure.

Figure 10:
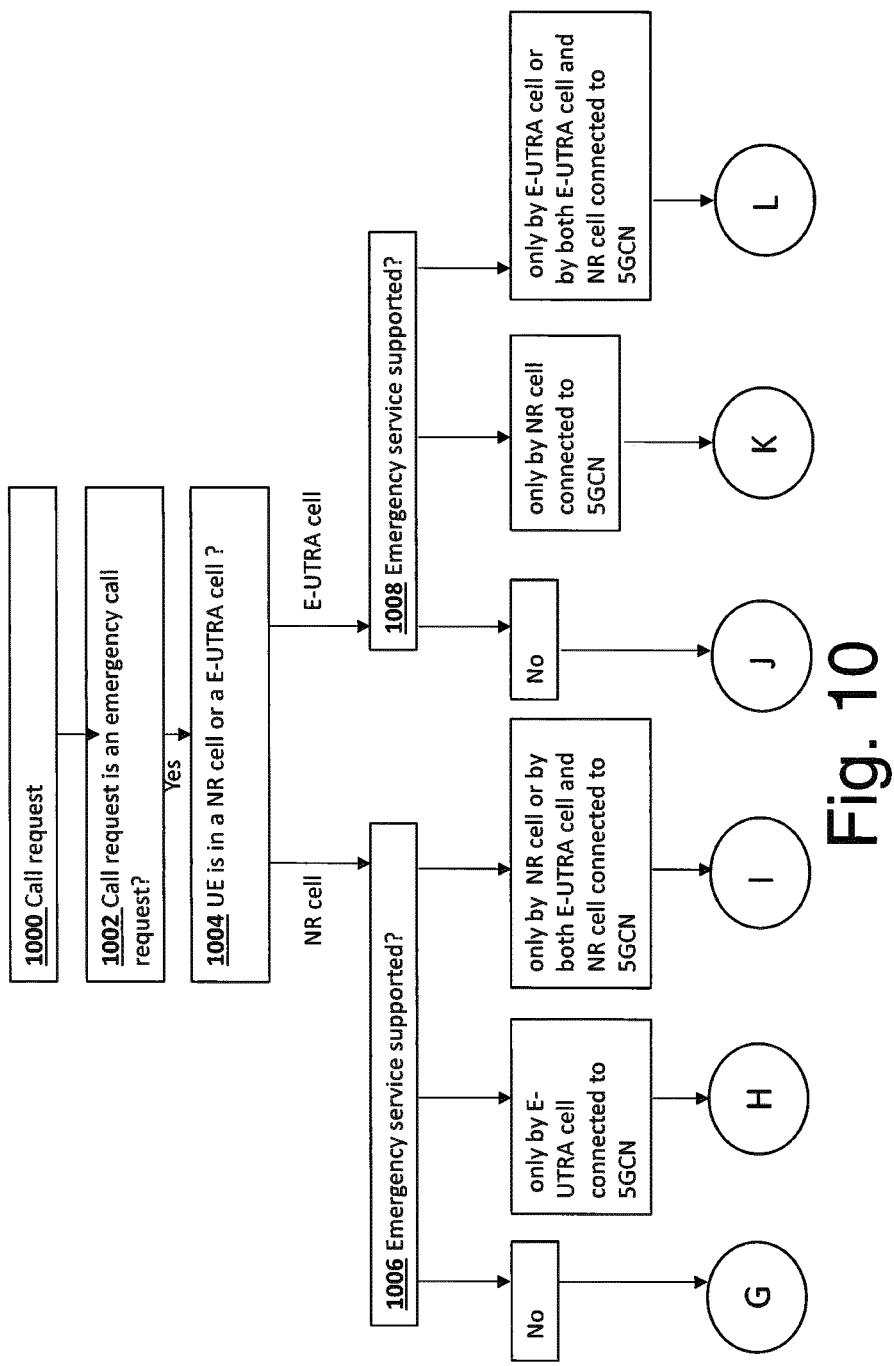
FIG. 10 shows a schematic representation of a diagram of a method performed by a communication device when the communication device operates in DR.

FIG. 10 shows a schematic representation of a diagram of a method performed by a user equipment when the user equipment operates in DR mode.

In step 1000, the UE receives a call request from a user.

In step 1002, the UE determines that the call request is an emergency call request.

In step 1004, the UE determines whether the UE is camping in an NR cell or in an E-UTRA cell. If the UE is camping in an NR cell, the method goes to step 1006. If the UE is camping in an E-UTRAN the method goes to step 1008.

In step 1006 (i.e. the UE is camping in an NR cell), the UE determines whether emergency services are supported by NR cells connected to 5GCN, for example based on an EMC. Likewise, the UE determines whether emergency services are supported by E-UTRAN cells connected to 5GCN, for example based on the EMC.

Figure 11:
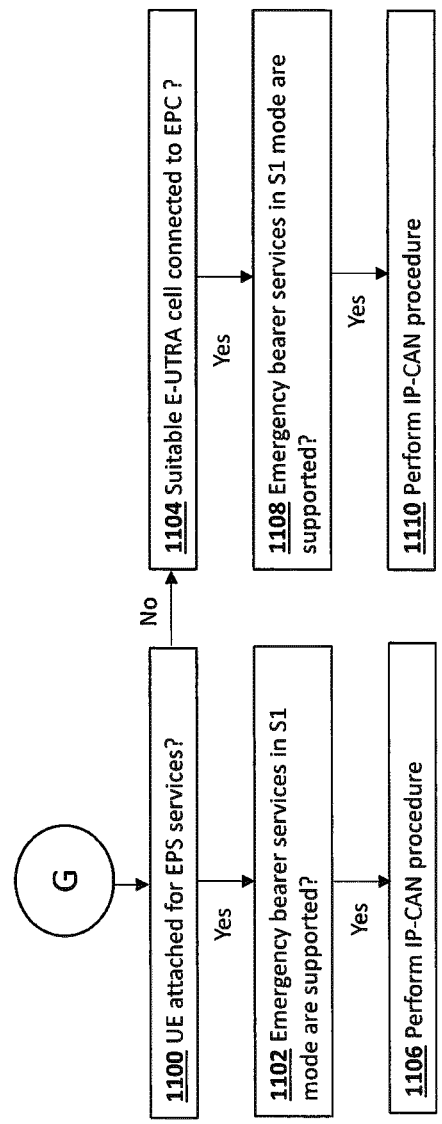
FIG. 11 shows a schematic representation of a diagram of a method performed by a communication device when the communication device in an NR cell operates in DR mode and emergency services are supported neither by E-UTRA cells connected to the 5GCN nor by NR cells connected to the 5GCN.

If the EMC indicates that emergency services are supported by none of NR cells connected to 5GCN and E-UTRAN cells connected to 5GCN, the method proceeds to step G (linking FIG. 10 to FIG. 11). If the EMC indicates that emergency services are supported by E-UTRAN cells connected to 5GCN only, the method proceeds to step H (linking FIG. 10 to FIG. 12). If the EMC indicates that emergency services are supported by NR cells connected to 5GCN only or both NR cells connected to 5GCN and E-UTRAN cells connected to 5GCN, the method proceeds to step I (linking FIG. 10 to FIG. 13).

In step 1008 (i.e. the UE is camping in an E-UTRAN cell), the UE determines whether emergency services are supported by NR cells connected to 5GCN, for example based on the EMC. Likewise, the UE determines whether emergency services are supported by E-UTRAN cells connected to 5GCN, for example based on the EMC.

If the EMC indicates that emergency services are supported by none of NR cells connected to 5GCN and E-UTRAN cells connected to 5GCN, the method proceeds to step J (linking FIG. 3 to FIG. 14). If the EMC indicates that emergency services are supported by NR cells connected to 5GCN only, the method proceeds to step K (linking FIG. 3 to FIG. 15). If the EMC indicates that emergency services are supported by E-UTRAN cells connected to 5GCN only or both NR cells connected to 5GCN and E-UTRAN cells connected to 5GCN, the method proceeds to step K (linking FIG. 3 to FIG. 16).

FIG. 11 shows a schematic representation of a diagram of a method performed by a UE when the UE camping in an NR cell operates in DR mode and emergency services are supported neither by E-UTRA cells connected to the 5GCN nor by NR cells connected to the 5GCN.

In step 1100, the UE determines whether the UE is attached for EPS services (i.e. whether the UE is registered to the EPS). If the UE is attached for EPS services, the method goes to step 1102. If the UE is not attached for EPS services, the method goes to 1104.

In step 1102, the UE determines whether emergency bearer services are supported, for example based on an EMC BS. If the EMC BS indicates that emergency bearer services in S1 mode are supported, the method goes to step 1106.

In step 1106 (i.e. emergency bearer services in S1 mode are supported), the UE attempts to perform an emergency call by performing an IP-CAN procedure.

In step 1104, the UE determines whether the supports accessing EPC via an E-UTRA cell and whether there is a suitable E-UTRA cell connected to EPC accessible by the UE. If the UE determines that there is a suitable E-UTRA cell connected to EPC accessible by the UE, the method goes to step 1108.

In step 1108 (i.e. there is suitable E-UTRA cell connected to EPC accessible by the UE) determines whether emergency bearer services are supported, for example based on an EMC BS. If the EMC BS indicates that emergency bearer services in S1 mode are supported, the method goes to step 1110.

In step 1110 (i.e. emergency bearer services in S1 mode are supported), the UE attempts to select the suitable E-UTRA cell connected to EPC and perform an emergency call by performing an IP-CAN procedure.

Figure 12:
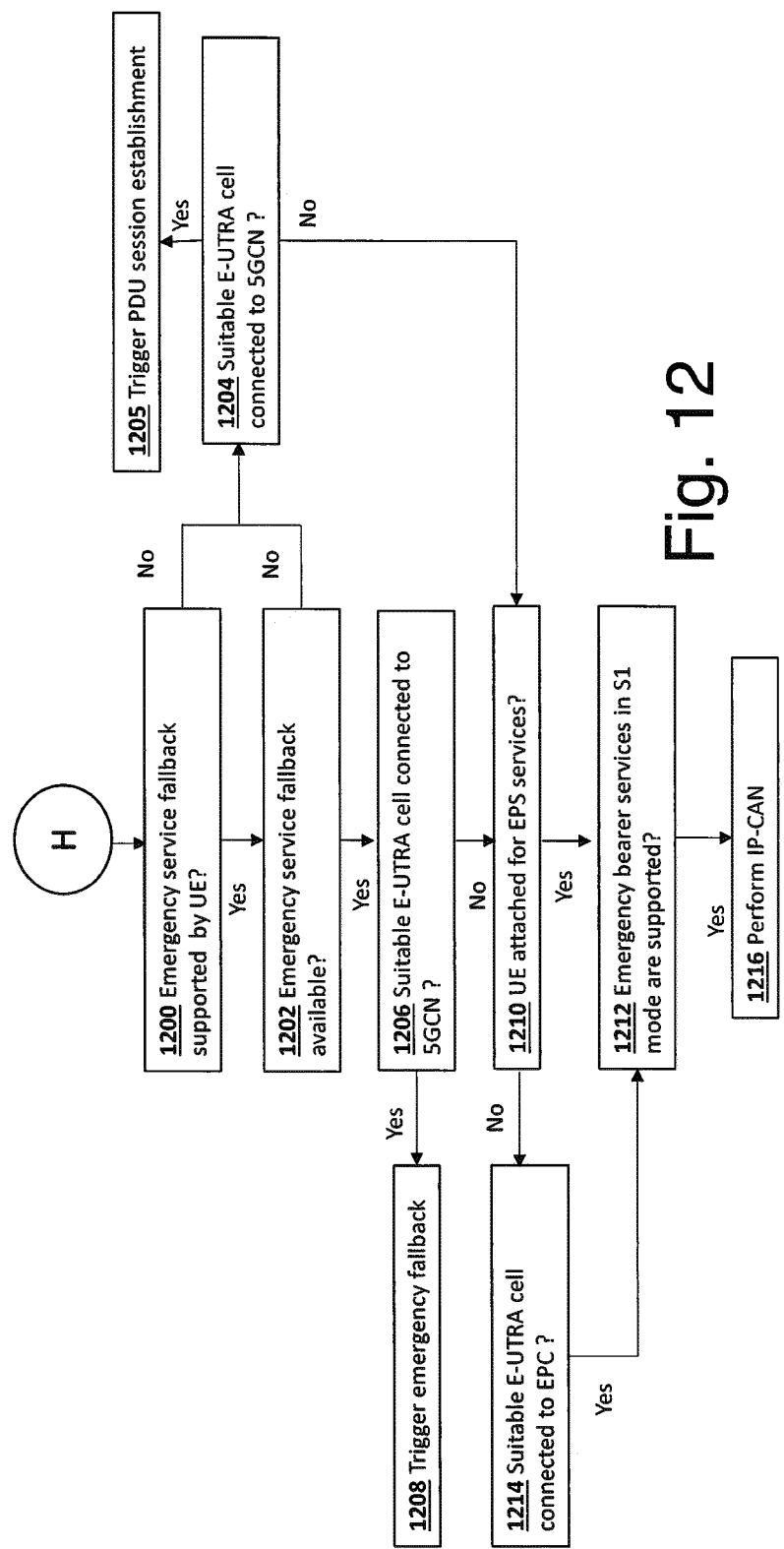
FIG. 12 shows a schematic representation of a diagram of a method performed by a communication device when the communication device in an NR cell operates in DR mode and emergency services are supported by E-UTRA cells connected to a 5GCN only.

FIG. 12 shows a schematic representation of a diagram of a method performed by a UE when the UE camping in an NR cell operates in DR mode and emergency services are supported by E-UTRA cells connected to the 5GCN only.

In step 1200, the UE determines whether the UE supports an emergency services fallback procedure. If the UE supports the emergency services fallback procedure, the method goes to step 1202. If the UE does not support the emergency services fallback procedure, the method goes to 1204.

In step 1202, the UE determines whether the emergency services fallback procedure is available, for example based on the ESFB. If the ESFB indicates the emergency services fallback procedure is available, the method goes to step 1206. If the ESFB indicates that the emergency services fallback procedure is not available, the method goes to 1204.

In step 1206 (i.e. the UE supports the emergency services fallback procedure and the emergency services fallback procedure is available), the UE determines whether the UE supports accessing 5GCN via a E-UTRA cell and whether there is a suitable E-UTRA cell connected to 5GCN accessible by the UE. If there is a suitable E-UTRA cell connected to 5GCN accessible by the UE, the method goes to step 1208. If there is no suitable E-UTRA cell connected to 5GCN accessible by the UE, the method goes to step 1210.

In step 1208, the UE attempts to select the suitable E-UTRA cell connected to 5GCN accessible by the UE and perform the emergency call by triggering an emergency services fallback procedure.

In step 1204 (i.e. the UE supports the emergency services fallback procedure and the emergency services fallback procedure is available), the UE determines whether the UE is capable of accessing 5GCN via an E-UTRA cell. In other words, the UE determines whether there is a suitable E-UTRA cell connected to 5GCN accessible by the UE. If there is a suitable E-UTRA cell connected to 5GCN accessible by the UE, the method goes to step 1205. If there is no suitable E-UTRA cell connected to 5GCN accessible by the UE, the method goes to step 1210.

In step 1205, the UE attempts to select the suitable E-UTRA cell connected to 5GCN accessible by the UE and perform the emergency call by triggering a PDU session establishment procedure.

In step 1210 (i.e. there is no suitable E-UTRA cell connected to 5GCN accessible by the UE), the UE determines whether the UE is attached for EPS services. If the UE is attached for EPS services, the method goes to step 1212. If the UE is not attached for EPS services, the method goes to 1214.

In step 1212 the UE determines whether emergency bearer services are supported, for example based on an EMC BS. If the EMC BS indicates that emergency bearer services in S1 mode are supported, the method goes to step 1216.

In step 1216 (i.e. emergency bearer services in S1 mode are supported), the UE attempts to perform an emergency call by performing an IP-CAN procedure.

In step 1214, the UE determines whether the UE supports accessing EPC via an E-UTRA cell and whether there is a suitable E-UTRA cell connected to EPC accessible by the UE. If the UE determines that there is a suitable E-UTRA cell connected to EPC accessible by the UE, the method goes to step 1212.

Figure 13:
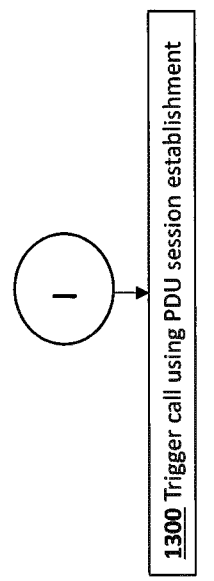
FIG. 13 shows a schematic representation of a diagram of a method performed by a communication device when the communication device in an NR cell operates in DR mode and emergency services are supported by E-UTRA cells connected to the 5GCN only or supported by both NR cells and E-UTRA cells connected to the 5GCN.

FIG. 13 shows a schematic representation of a diagram of a method performed by a UE when the UE camping in an NR cell operates in DR mode and emergency services are supported by NR cells connected to the 5GCN only or supported by both NR cells and E-UTRA cells connected to the 5GCN.

In step 1300 the UE attempts to perform an emergency call by triggering a PDU session establishment procedure.

Figure 14:
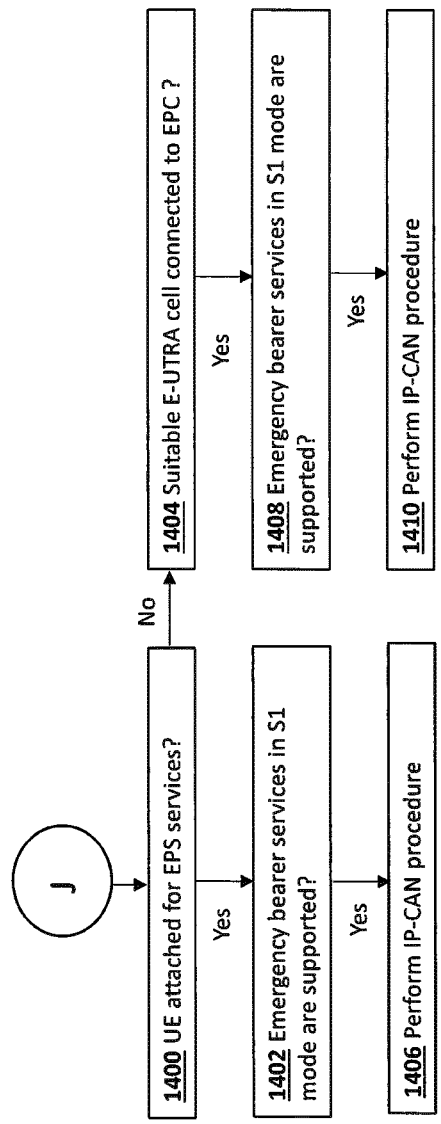
FIG. 14 shows a schematic representation of a diagram of a method performed by a communication device when the communication device in an E-UTRA cell operates in DR mode and emergency services are supported neither by E-UTRA cells connected to the 5GCN nor by NR cells connected to the 5GCN.

FIG. 14 shows a schematic representation of a diagram of a method performed by a UE when the UE camping in an E-UTRA cell operates in DR mode and emergency services are supported neither by E-UTRA cells connected to the 5GCN nor by NR cells connected to the 5GCN.

In step 1400, the UE determines whether the UE is attached for EPS services. If the UE is attached for EPS services, the method goes to step 1402. If the UE is not attached for EPS services, the method goes to 1404.

In step 1402, the UE determines whether emergency bearer services are supported, for example based on an EMC BS. If the EMC BS indicates that emergency bearer services in S1 mode are supported, the method goes to step 1406.

In step 1406 (i.e. emergency bearer services in S1 mode are supported), the UE attempts to perform an emergency call by performing an IP-CAN procedure.

In step 1404, the UE determines whether the UE supports accessing EPC via an E-UTRA cell and whether there is a suitable E-UTRA cell connected to EPC accessible by the UE. If the UE determines that there is a suitable E-UTRA cell connected to EPC accessible by the UE, the method goes to step 1408.

In step 1408 (i.e. there is suitable E-UTRA cell connected to EPC accessible by the UE) determines whether emergency bearer services are supported, for example based on an EMC BS. If the EMC BS indicates that emergency bearer services in S1 mode are supported, the method goes to step 1410.

In step 1410 (i.e. emergency bearer services in S1 mode are supported), the UE attempts to select the suitable E-UTRA cell connected to EPC and perform an emergency call by performing an IP-CAN procedure.

Figure 15:
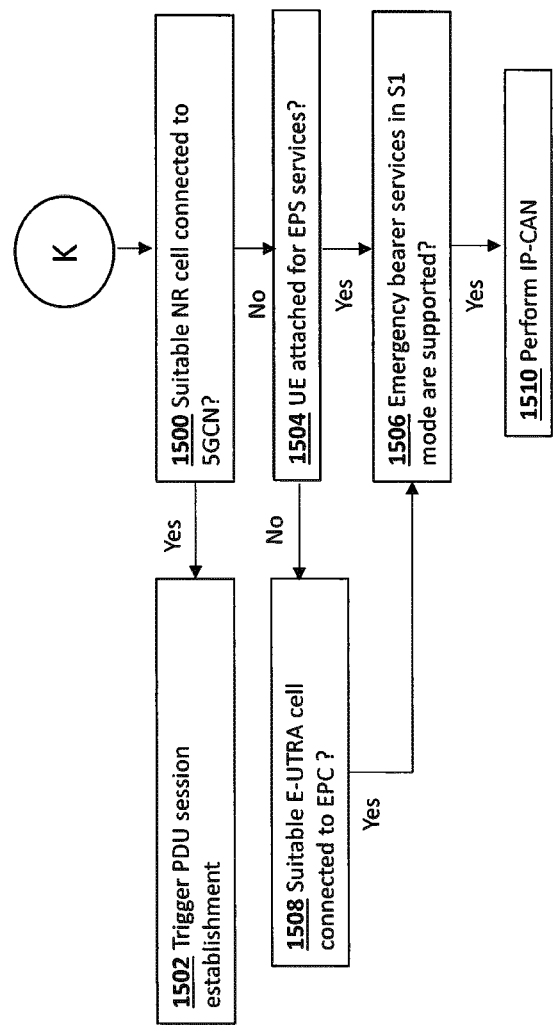
FIG. 15 shows a schematic representation of a diagram of a method performed by a communication device when the communication device in an E-UTRA cell operates in DR mode and emergency services are supported by NR cells connected to a 5GCN only.

FIG. 15 shows a schematic representation of a diagram of a method performed by a UE when the UE camping in an E-UTRA cell operates in DR mode and emergency services are supported by NR cells connected to the 5GCN only.

In step 1500, the UE determines whether the UE supports accessing 5GCN via a NR cell and whether there is a suitable NR cell connected to 5GCN accessible by the UE. If there is a suitable NR cell connected to 5GCN accessible by the UE, the method goes to step 1502. If there is no suitable NR-cell connected to 5GCN accessible by the UE, the method goes to step 1504.

In step 1502 (i.e. there is a suitable NR cell connected to 5GCN accessible by the UE), the UE attempts to select the suitable NR cell connected to 5GCN and perform an emergency call by performing a PDU session establishment procedure.

In step 1504 (i.e. there is no suitable NR cell connected to 5GCN accessible by the UE), the UE determines whether the UE is attached for EPS services. If the UE is attached for EPS services, the method goes to step 1506. If the UE is not attached for EPS services, the method goes to 1508.

In step 1506, the UE determines whether emergency bearer services are supported, for example based on an EMC BS. If the EMC BS indicates that emergency bearer services in S1 mode are supported, the method goes to step 1510.

In step 1510 (i.e. emergency bearer services in S1 mode are supported), the UE attempts to perform an emergency call by performing an IP-CAN procedure.

In step 1508, the UE determines whether the UE supports accessing EPC via an E-UTRA cell and whether there is a suitable E-UTRA cell connected to EPC accessible by the UE. If the UE determines that there is a suitable E-UTRA cell connected to EPC accessible by the UE, the method goes to step 1506.

Figure 16:
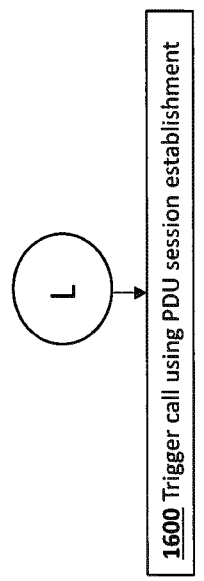
FIG. 16 shows a schematic representation of a diagram of a method performed by a communication device when the communication device in an E-UTRA cell operates in DR mode and emergency services are supported by NR cells connected to the 5GCN only or supported by both NR cells and E-UTRA cells connected to the 5GCN.

FIG. 16 shows a schematic representation of a diagram of a method performed by a UE when the UE camping in an NR cell operates in DR mode and emergency services are supported by NR cells connected to the 5GCN only or supported by both NR cells and E-UTRA cells connected to the 5GCN.

In step 1600 the UE attempts to perform an emergency call by triggering a PDU session establishment procedure.

It will be understood that although the methods of FIGS. 3 to 16 have been described in relation to 5G and E-UTRAN, the same concepts are applicable to other types of radio access technologies.

Figure 17:
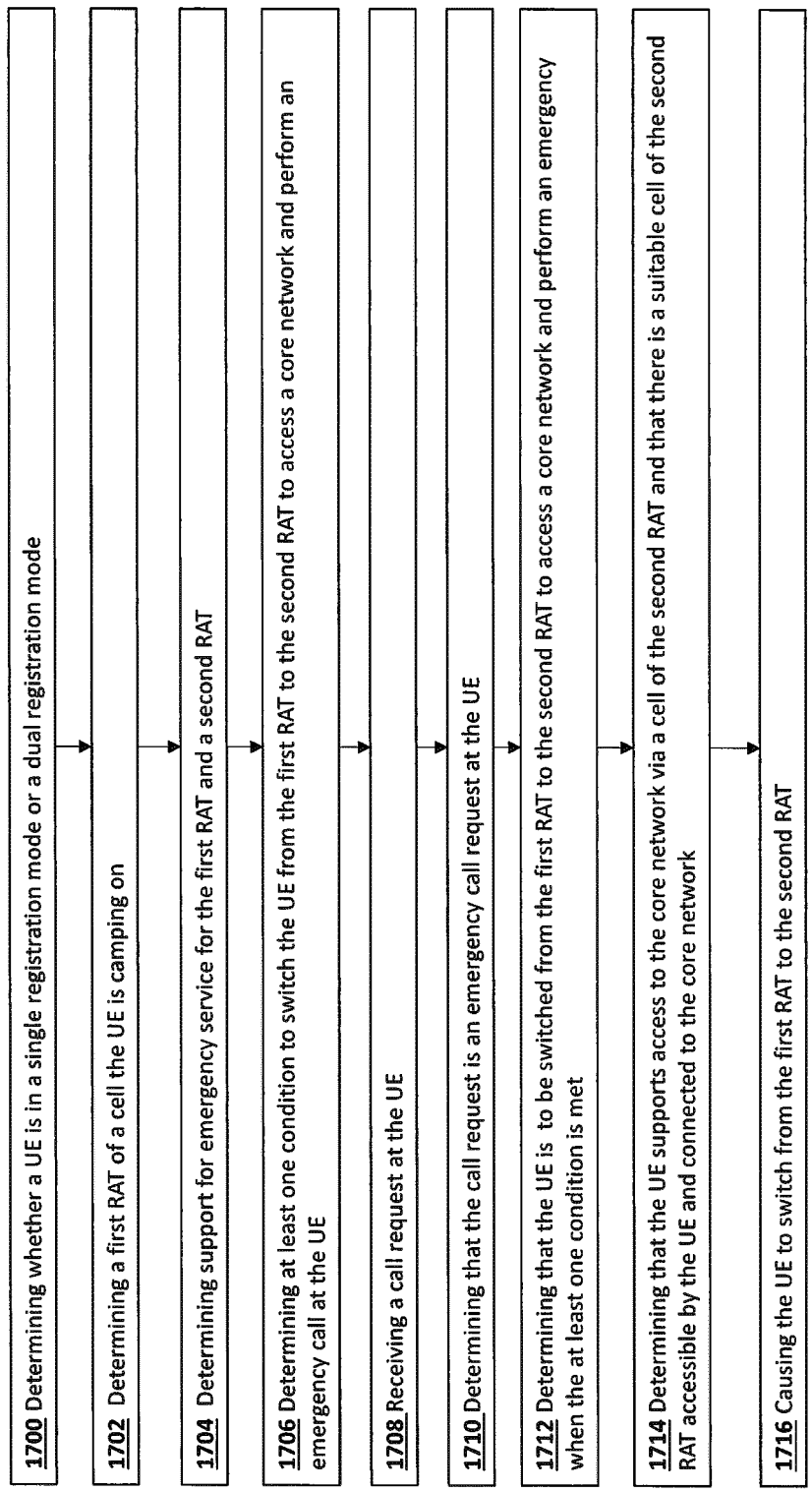
FIG. 17 shows a schematic representation of a diagram of a method performed by a communication device when the communication device receives an emergency call request.

FIG. 17 is a schematic representation of a diagram of a method performed by a user equipment. It will be understood that the following steps may be performed in any suitable order.

In step 1700, the UE determines whether the UE operates in SR mode or DR mode.

In step 1702, the UE determines a first radio access technology of a cell the UE is camping on.

In step 1704, UE determines (i) whether both the first radio access technology and a second radio access technology support an emergency service or only the first radio access technology supports the emergency service, (ii) whether only the second radio access technology supports the emergency service or (iii) whether none of the first radio access technology and the second radio access technology supports the emergency service.

In step 1704, the UE determines at least one condition to attempt to switch the UE from using the first RAT to using the second RAT to access the first RAT core network or the second RAT core network and perform an emergency call. The least one condition is determined based on whether the UE operates in SR mode or DR mode, the first RAT and whether (i) both the first radio access technology and a second radio access technology support an emergency service or only the first radio access technology supports the emergency service, (ii) only the second radio access technology supports the emergency service or (iii) none of the first radio access technology and the second radio access technology supports the emergency service (e.g. see branches A to L on FIGS. 3 to 10).

In an example, the UE operates in SR mode, the UE camps on a 5G cell and none of 5G and E-UTRA supports the emergency service (branch A—FIG. 4). At least one condition to attempt to switch from using a 5G cell to using an E-UTRA cell to access 5GCN and perform an emergency call by triggering an emergency fallback procedure comprise:

the UE supports an emergency services fallback procedure (step 400), the emergency services fallback procedure is not available (step 402), and the emergency service fallback procedure is only supported in second RAT cells connected to the first RAT core network (step 408).

In step 1706, in response to the at least one condition being met the UE ensures that the user equipment supports access to the first RAT core network or the second RAT core network via a cell of the second radio access technology.

In the above example, the UE determines that the UE supports access to 5GN via an E-UTRA cell (step 410).

In step 1708, the UE determines that there is a suitable cell of the second radio access technology accessible by the user equipment and connected to the first RAT core network or the second RAT core network.

In the above example, the UE determines that there is a suitable E-UTRA cell connected to 5GCN accessible by the UE (step 410).

In step 1710, the UE attempts to switch from the first RAT to the second RAT to access the first RAT core network or the second RAT core network and perform an emergency call. If the switch is successful, the UE performs the emergency call.

In the above example, the UE performs the emergency call by triggering an emergency service fallback procedure (step 412).

An advantage of the above method is that by implementing steps 1708 and/or 1710, the risk of failure when attempting the switch from the first RAT to the second RAT may be minimized. Indeed, unlike existing solutions the UE does not attempt to switch from the first RAT to the second RAT blindly.

The required data processing apparatus and functions may be provided by means of one or more data processors. The apparatus may be provided in the communications device, in the control apparatus and/or in the access point. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. In particular, it will be understood that one or more of the above embodiment may be combined. However, all such and similar modifications of the teachings of this invention will still fall within the spirit and scope of this invention as defined in the appended claims.

Indeed there is a further embodiment comprising a combination of one or more of any of the other embodiments previously discussed.

The invention claimed is:

1. A user equipment, comprising:
at least one processor; and
at least one memory including computer program code;
wherein the computer program code is configured to, when executed by the at least one processor, cause the user equipment at least to perform: when the user equipment operates in a dual registration mode:
upon receiving a call request and determining that the call request is an emergency call request, determining whether the user equipment is camping in a cell of a first radio access technology, wherein the cell of the first radio access technology is connected to a core network;
upon determining that the user equipment is camping in the cell of the first radio access technology, determining whether an emergency service is supported only in cells of a second radio access technology, wherein the second radio access technology is different than the first radio access technology and the cells of the second radio access technology are connected to the core network;
upon determining that the emergency service is supported only in the cells of the second radio access technology, determining whether the user equipment supports access to emergency services fallback;
upon determining that the user equipment does not support emergency services fallback, determining whether the user equipment supports access to the core network via the cells of the second radio access technology, upon determining that the user equipment supports access to the core network via the cells of the second radio access technology, attempting to select a cell of the cells of the second radio access technology; and
upon selecting the cell of the cells of the second radio access technology, performing the emergency call by triggering establishment of a packet data unit session for the emergency service via the cell of the second radio access technology that is selected.

2. The user equipment according to claim 1, wherein the computer program code is configured to, when executed by the at least one processor, further cause the user equipment at least to perform:
disabling first radio access technology capability of the user equipment.

3. The user equipment according to claim 1, wherein the first radio access technology comprises third generation partnership project new radio.

4. The user equipment according to claim 1, wherein the core network comprises a fifth generation core network.

5. The user equipment according to claim 1, wherein the second radio access technology comprises an evolved universal mobile telecommunication system terrestrial radio access network.

6. A method for a user equipment, the method comprising, when the user equipment operates in a dual registration mode:
upon receiving a call request and determining that the call request is an emergency call request, determining whether the user equipment is camping in a cell of a first radio access technology, wherein the cell of first radio access technology is connected to a core network, wherein the cell is a cell of first radio access technology;
upon determining that the user equipment is camping in the cell of the first radio access technology, determining whether an emergency service is supported only in cells of the second radio access technology, wherein the second radio access technology is different than the first radio access technology and the cells of the second radio access technology are connected to the core network;

upon determining that the emergency service is supported only in the cells of the second radio access technology, determining whether the user equipment supports access to emergency services fallback;

upon determining that the user equipment does not support emergency services fallback, determining whether the user equipment supports access to the core network via the cells of the second radio access technology, and upon determining that the user equipment supports access to the core network via the cells of the second radio access technology, attempting to select a cell of the cells of the second radio access technology; and upon selecting the cell of the cells of the second radio access technology, performing the emergency call by triggering establishment of a packet data unit session establishment for the emergency service via the cell of second radio access technology that is selected.

7. A non-transitory computer-readable medium comprising instructions which, when executed by one or more processors of a user equipment, cause the one or more processors of the user equipment, to perform, when the user equipment is operating in a dual registration mode:

upon receiving a call request and determining that the call request is an emergency call request, determining whether the user equipment is camping in a cell of a first radio access technology, wherein the cell of the first radio access technology is connected to a core network;

upon determining that the user equipment is camping in the cell of the first radio access technology, determining whether an emergency service is supported only in cells of a second radio access technology, wherein the second radio access technology is different than the first radio access technology and the cells of the second radio access technology are connected to the core network;

upon determining that the emergency service is supported in only the cells of the second radio access technology, determining whether the user equipment supports emergency services callback;

upon determining that the user equipment does not support emergency services fallback, determining whether the user equipment supports access to the core network via the cells of the second radio access technology, and upon determining that the user equipment supports access to the core network via the cells of the second radio access technology, attempting to select a cell of the cells of the second radio access technology; and upon selecting the cell of the cells of the second radio access technology, performing the emergency call by triggering establishment of a packet data unit session for the emergency service via the cell of the second radio access technology that is selected.

* * * * *